United States Patent
Kato et al.

(12) 
(10) Patent No.: US 6,179,423 B1
(45) Date of Patent: Jan. 30, 2001

(54) PROJECTION-TYPE IMAGE DISPLAY SYSTEM

(75) Inventors: Hiromi Kato; Hiroshi Hamada, both of Nara (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/210,787

(22) Filed: Dec. 15, 1998

(30) Foreign Application Priority Data

Dec. 22, 1997 (JP) .................................................... 9-353859
Nov. 10, 1998 (JP) .................................................. 10-318749

(51) Int. Cl.$^7$ ................................................. G03B 21/00
(52) U.S. Cl. ................................................. 353/31; 353/34
(58) Field of Search ................................. 349/5, 7, 8, 9, 349/10; 353/33, 34, 37, 82, 63, 65, 66, DIG. 3, DIG. 4, 20, 31; 359/619, 620, 621

(56) References Cited

U.S. PATENT DOCUMENTS

| 5,260,815 | * | 11/1993 | Takizawa | 359/41 |
| 5,327,270 | * | 7/1994 | Miyatake | 359/63 |
| 5,371,559 | * | 12/1994 | San-Nohe et al. | 353/31 |
| 5,381,197 | * | 1/1995 | Yoshida et al. | 353/98 |
| 5,477,359 | * | 12/1995 | Okazaki | 359/77 |
| 5,631,750 | * | 5/1997 | Minoura et al. | 349/110 |
| 5,822,021 | * | 10/1998 | Johnson et al. | 348/742 |

FOREIGN PATENT DOCUMENTS

| 63-039294 | 2/1988 | (JP) . |
| 04194921 | 7/1992 | (JP) . |
| 07128664 | 5/1995 | (JP) . |

* cited by examiner

Primary Examiner—Safet Metjahic
Assistant Examiner—E P LeRoux
(74) Attorney, Agent, or Firm—Nixon & Vanderhye P.C.

(57) ABSTRACT

An illuminating light incidence mirror for introducing an illuminating light to reflection-type liquid crystal panels is provided in one of two pupil division regions constituting a pupil region of a projection lens, and reflected lights directly reflected by the reflection-type liquid crystal panels are transmitted through the other pupil division region of the projection lens and projected. In dark display, the reflected lights from the reflection-type liquid crystal panels and surface-reflected lights reflected by surfaces of the reflection-type liquid crystal panels are blocked by polarizing plates. Further, since λ/4 plates and the polarizing plates are provided at inclinations with respect to the reflection-type liquid crystal panels, respectively, projection of surface-reflected lights from the λ/4 plates and the polarizing plates onto a screen can be avoided.

29 Claims, 14 Drawing Sheets

PROJECTION-TYPE IMAGE DISPLAY SYSTEM

FIELD OF THE INVENTION

The present invention relates to a projection-type image display system which performs image display, by magnifying and projecting an image formed by an image display element, with the use of a projection lens or the like.

BACKGROUND OF THE INVENTION

A projection-type image display system magnifies and projects an image displayed on an image display element through a projection optical system, by utilizing the image display element as an optical switching element. Examples used as such image display elements include a transmission-type image display element which transmits and projects light, and a reflection-type image display element which reflects and projects light.

In a projection-type image display system using a transmission-type image display element, (1) a path of an illuminating light directed to the image display element, and (2) a path through which a light transmitted through and modulated by the image display element is projected through a projection lens onto a screen, are provided in different regions, respectively. On the other hand, in a projection-type image display system using a reflection-type image display element, parts or wholes of (1) a path of an illuminating light and (2) a path of a reflected light which has been modulated by the image display element are provided in the same region. Therefore, the projection-type image display system using the reflection-type image display element occupies a smaller space.

Further, in the transmission-type image display system, generally each pixel is equipped with a driving transistor. To prevent transistor characteristics from varying due to projection of light on the driving transistors, light blocking layers are laid on the driving transistors and signal lines to the pixels. The light blocking layers unavoidably make a numerical aperture of the pixels smaller. On the other hand, in the reflection-type image display element, generally the reflection surfaces serve as the light blocking layers, resulting in that the numerical aperture of the pixels is greater than that of the transmission type.

As a projection-type image display system using a reflection-type image display element, the Japanese Publication for Laid-Open Patent Application No. 63-39294/1988 (Tokukaisho 63-39294) discloses a video projection device having an optical system which decomposites/composites light from a light source by polarizing the same. Further, for example, the Japanese Publication for Laid-Open Patent Application No. 4-194921/1992 (Tokukaihei 4-194921) discloses a projection-type liquid crystal display (LCD) system using a polymer-diffusion-type liquid crystal, which modulates intensity of illuminating light by varying diffusion of reflected light, while the Japanese Publication for Laid-Open Patent Application No. 7-128664/1995 (Tokukaihei 7-128664) discloses a liquid crystal projector having a substantially identical structure to that of the foregoing projection-type LCD device.

First of all, a video projection device disclosed by Tokukaisho 63-39294 will be explained below.

FIG. 13 is a schematic view illustrating an arrangement of the video projection device. The video projection device is equipped with a light source 21, a collimator lens 22 which collimates light from the light source, a polarizing beam splitter (hereinafter referred to as PBS) 23, a color decompositing prism 24, LCD elements 25, 26, and 27 which display blue, red, and green image components, respectively, reflection mirrors 28, 29, and 30 mounted on the LCD elements 25, 26, and 27, respectively, and a projection lens 32.

Light emitted from the light source 21 goes through the collimator lens 22, thereby becoming a substantially parallel light, and enters the PBS 23, where the light is split into linearly polarized light components directed in two directions orthogonal to each other. The light reflected by the PBS 23 out of lights obtained by splitting enters the color decompositing prism 24.

The color decompositing prism 24 is composed of a first prism 24A, a second prism 24B, and a third prism 24C. The light incident on the color decompositing prism 24 first enters the first prism 24A, where a blue component is separated by a dichroic interference thin film and is guided to the LCD element 25 for displaying an image of the blue component. The light other than the blue component is incident on the second prism 24B, where a red component is separated by a dichroic interference thin film and is guided to the LCD element 26 for displaying an image of the red component. The rest green component light is incident on the third prism 24C, and is incident on the LCD element 27 for displaying an image of the green component.

The respective color component lights incident on the LCD elements 25, 26, and 27 are reflected by the reflection mirrors 28, 29, and 30, respectively, and go through the LCD elements 25, 26, and 27 again, respectively. Here, the color component lights going through the LCD elements 25, 26, and 27 are subject to modulation of polarization directions, in accordance with image signals of the LCD elements 25, 26, and 27, respectively.

The color component lights subject to the modulation of polarization direction are again incident on the color decompositing prism 24, where they are composed. The composed light is incident on the PBS 23, and only the polarized components which are allowed to go through the PBS 23, out of the light subject to the modulation of polarization direction, are projected onto a screen (not shown) by the projection lens 32.

Next, the projection-type LCD device disclosed by Tokukaihei 4-194912 will be explained below.

FIG. 14 is a schematic view illustrating an arrangement of the projection-type LCD device. The projection-type LCD device is equipped with a light source section including a light source 41 and a paraboloidal mirror 42, a lens 43 for converging light from the light source section, a cross dichroic prism 44, reflection/diffusion-type LCD devices 45R, 45G, and 45B for displaying images of red, green, and blue color components, respectively, a convergence lens 46, first and second blocking masks 47 and 48, a reflection mirror 49, a projection lens 50, and a screen 51.

White light emitted from the light source section is converged by the lens 43, and reflected by the reflection mirror 49. Thereafter, the white light goes through the convergence lens 46, thereby being converted to a substantially parallel light, and is incident on the cross dichroic prism 44.

The white light incident on the cross dichroic prism 44 is decomposited into red, green, and blue color components, and the color components are reflected by the reflection/diffusion-type LCD devices 45R, 45G, and 45B, respectively. Here, degrees of diffusion of the lights of the respective color components upon reflection are varied in accordance with image signals of the reflection/diffusion-type LCD devices 45R, 45G, and 45B, respectively.

The lights of the color components reflected by the reflection/diffusion-type LCD devices 45R, 45G, and 45B are composited by the cross dichroic prism 44, and the composited light enters the convergence lens 46. The light entering the convergence lens 46 is converged to the vicinity of an aperture surrounded by an end of the first blocking mask 47 and an end of the reflection mirror 49, and is projected onto the screen 51 through the projection lens 50.

When the projection-type LCD device conducts black display, lights of the color components reflected by the reflection/diffusion-type LCD devices 45R, 45G, and 45B become diffused lights. The diffused lights are hardly converged to the vicinity of the aperture by the convergence lens 46, but are absorbed and blocked by the first and second blocking masks 47 and 48, or alternatively, reflected by the reflection mirror 49 thereby returning to the light source section. As a result, the diffused lights are not projected on the screen 51. In other words, in such a projection-type LCD device, the convergence lens 46, the first blocking mask 47, and the reflection mirror 49 compose a schlieren optical system, so that an image is enlarged and projected on the screen 51. Therefore, to ensure that brightness and darkness in an image are determined in accordance with diffusion of the reflected light which varies according to image signals, schlieren stoppers such as the first and second masks and the reflection mirror 49 are indispensable.

Subsequently, the following description will explain the liquid crystal projector disclosed by Tokukaihei 7-128664.

FIG. 15 is a schematic view illustrating an arrangement of the liquid crystal projector. The liquid crystal projector incorporates a reflection mirror 61, a convergence lens 62, a cross dichroic prism 63, a diffusion-type liquid crystal panel 64G for displaying an images of a green component, and a first blocking mask 65. Incidentally, FIG. 15 is a top view of the liquid crystal projector, and diffusion-type liquid crystal panels 64R and 64B for displaying images of red and blue components are provided on the upper and lower sides of the cross dichroic prism 63, respectively, though not shown in the figure.

An illuminating light from a light source, reflected by the reflection mirror 61, enters the convergence lens 62. Then, the illuminating light enters the cross dichroic prism 63 which is disposed in contact with the convergence lens 62, and is decomposited into color components of red, blue, and green. Then, the color components are made incident on the diffusion-type liquid crystal panels 64R, 64G, and 64B, respectively, and are reflected. Upon reflection of the lights of the color components by the diffusion-type liquid crystal panels 64R, 64G, and 64B, the lights are diffused in the case of the black display. The lights of the color components reflected by the diffusion-type liquid crystal panels 64R, 64G, and 64B are composited by the cross dichroic prism 63, and the composited light is converged to the vicinity of an aperture diaphragm formed between the first blocking mask 65 and the reflection mirror 61 by the convergence lens 62. Thereafter, the light is projected onto a screen, not shown, by a projection lens, not shown.

In the foregoing arrangement, conventionally, unnecessary light UL due to inner surface reflection of the cross dichroic prism 63 or the like proceeds as indicated by a broken line in FIG. 15, in the same direction as the lights reflected by the diffusion-type liquid crystal panels 64R, 64G, and 64B proceed, and hence, even when the black display is conducted, a part of the unnecessary light UL is projected onto the screen through the aperture diaphragm. This causes deterioration in contrast.

In this aspect, in the foregoing liquid crystal projector, the cross dichroic prism 63 is slightly revolved so as to be disposed with an inclination, so that the unnecessary light UL is prevented from going through the aperture diaphragm. With this arrangement, improvement in the contrast ratio is attempted.

In the aforementioned video projection device, a PBS for switcing optical paths depending on the polarization direction is needed as a constituent member. Generally, the PBS is composed of glass blocks, and such a PBS is great in volume and weight, and costs high. Besides, due to birefringence inherent in the glass which the PBS is made of, a polarization direction of incident light is disordered, whereby to precisely switch optical paths is difficult. As a result, quality of projected images degrades, while a contrast ratio of the same lowers.

On the other hand, in respect of the aforementioned projection-type LCD device or liquid crystal projector, when the black display is to be conducted, most of light is diffused and reflected by the LCD element so as not go through the aperture diaphragm, for realization of the black display. However, no matter how the degree of diffusion of the reflected light during the black display period is heightened, it is unavoidable, from structural characteristics of the device, that the unnecessary light more or less passes the aperture diaphragm. Even in the unnecessary light is reduced to only 1 percent of the total quantity of light, the contrast ratio is deteriorated to 100:1, which is far from the level of practical application.

In the case where the aperture diaphragm is made smaller to block as much of the unnecessary light as possible, the unnecessary light is surely reduced. At the same time, however, the light quantity during the white display period is also reduced, and consequently brightness of projected images lowers. In short, as to the arrangement wherein the black display is performed by diffusing reflected light, lowering of the contrast ratio is a theoretically unavoidable problem.

Another cause that lowers the contrast ratio is unnecessary light occurring due to surface reflection, inside reflection, and the like of optical members. Particularly, the surface reflection is a cause of a magnitude to lower the contrast ratio, since the surface reflection causes light reflected to proceed in the same direction as light modulated by the liquid crystal panels proceeds. Since about 1 percent of surface reflection is still unavoidable even with application of surface-reflection-prevention coating thereto, the contrast ratio deteriorates as long as an optical member causing surface reflection exists.

As a countermeasure against the foregoing problem, an optical member such as the cross dichroic prism may be provided at an inclination, like in the aforementioned liquid crystal projector. With such an arrangement, the surface-reflected light can be prevented from passing the aperture diaphragm. If, however, the cross dichroic prism between the projection lens and the liquid crystal panels is provided at an inclination, an aberration occurs. The aberration has a greater magnitude, as the glass block provided at an inclination causes light transmitted therethrough to have a longer optical path. Therefore, in the case where an optical member such as the cross dichroic prism which may make the optical path of light transmitted therethrough longer is provided at an inclination, a great aberration occurs, thereby making it difficult to remove the aberration by appropriately design the projection lens.

Further, regarding the surface reflection by the liquid crystal panel, in the case where the liquid crystal panel is provided at an inclination to prevent the surface reflection, a focal position varies depending on a display area in the liquid crystal panel, and a projected image also becomes deformed to a trapezoid on the screen. Therefore, it is impossible to provide the liquid crystal panel at an inclination, and the surface reflection by the liquid crystal panel is theoretically unavoidable.

SUMMARY OF THE INVENTION

The object of the present invention is to provide a projection-type image display system incorporating a reflection-type image display element, which is characterized in low costs, being small in size and weight, high contrast ratio, and good image quality.

To achieve the aforementioned object, a projection-type image display system of the present invention is characterized by comprising (i) a light source emitting an illuminating light, (ii) a reflection-type image display element for modulating an incident light in accordance with an image display state, and directly reflecting the incident light, (iii) a projection lens composed of at least two lens groups, a pupil region of the projection lens being formed between the lens groups, and (iv) illuminating light introducing means for introducing the illuminating light to the reflection-type image display element, the illuminating light introducing means being provided in one of two pupil division regions which are formed by dividing the pupil region of the projection lens into two, wherein after being directly reflected by the reflection-type image display element, the illuminating light goes through the other pupil division region of the projection lens and is projected.

With the foregoing arrangement, the reflection-type image display element presents dark display and bright display by modulating the incident light and directly reflects the incident light irrelevant to its display state. Therefore, a light blocking mask such as an aperture diaphragm as above described is unnecessary. Besides, a problem of deterioration of a contrast ratio which entails the use of the light blocking mask can be solved.

Moreover, since the illuminating light introduction means is provided on one of the two pupil division regions and the light directly reflected by the reflection-type image display element is transmitted through the other pupil division region and is projected, means for separating the incident light and the projection light is unnecessary. Therefore, adverse influences of birefringence inherent in glass constituting the polarizing beam splitter are not produced, thereby ensuring that the image quality of projected images can be improved.

The foregoing projection-type image display system may further comprise a dichroic mirror for decompositing the illuminating light, sending the decomposited lights to the reflection-type image display element, and compositing reflected lights from the reflection-type image display element.

With the foregoing arrangement wherein the dichroic mirror is used as means for color decomposition/ composition, costs of the system are lower and the system can be made lighter in weight, as compared with the case where, for example, a cross dichroic prism is used. Since the dichroic mirror has a flat-board-like shape, and conducts color decomposition/composition of light by transmission and reflection, directions of the transmission and reflection can be freely set, whereby freedom in arrangement can be relatively increased. Therefore, freedom in arrangement of the other elements composing the projection-type image display system is also increased, whereby freedom in determining a shape of the projection-type image display system can be increased.

Furthermore, a projection-type image display system of the present invention is characterized by comprising (i) a light source emitting an illuminating light, (ii) a plurality of reflection-type image display elements, each reflection-type image display element modulating an incident light in accordance with an image display state and directly reflecting the incident light, (iii) a projection lens composed of at least two lens groups, a pupil region of the projection lens being formed between the lens groups, (iv) illuminating light introducing means for introducing the illuminating light to the reflection-type image display elements, the pupil region being divided into first and second pupil division regions and the illuminating light introducing means being provided in the first pupil division region, and (v) a cross dichroic prism for directing lights of color components resulting on decomposition of the illuminating light to the reflection-type image display elements, respectively, and compositing the lights of color components reflected from the reflection-type image display elements, wherein a reflected light obtained by the composition by the cross dichroic prism goes through the second pupil division region of the projection lens and projected.

With the foregoing arrangement, the reflection-type image display element presents dark display and bright display by modulating the incident light and directly reflects the incident light irrelevant to its display state. Therefore, a light blocking mask such as an aperture diaphragm as above described is unnecessary. Besides, a problem of deterioration of a contrast ratio which entails the use of the light blocking mask can be solved. Moreover, since the illuminating light introduction means is provided on one of the two pupil division regions, while the light directly reflected by the reflection-type image display element is transmitted through the other pupil division region and is projected, means for separating the incident light and the projection light is unnecessary. Therefore, adverse influences of birefringence inherent in glass constituting the polarizing beam splitter are not produced, thereby ensuring that the image quality of projected images can be improved.

Furthermore, in the aforementioned arrangement, the cross dichroic prism is used as means for directing lights of color components resulting on decomposition of the illuminating light to the reflection-type image display elements, respectively, and compositing the lights of color components reflected from the reflection-type image display elements. Since the cross dichroic prism requires a smaller space as compared with the dichroic mirror, the projection-type image display system can be made smaller. Moreover, since the cross dichroic prism is small in size, a distance between the projection lens and the reflection-type image display element is shortened, a necessary back focal distance becomes shorter. As a result, the projection lens per se need not be large in size, thereby making it possible to make the optical system compact in size.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

The following description will explain an embodiment of the present invention, while referring to FIGS. 1 through 9.

Figure 1:
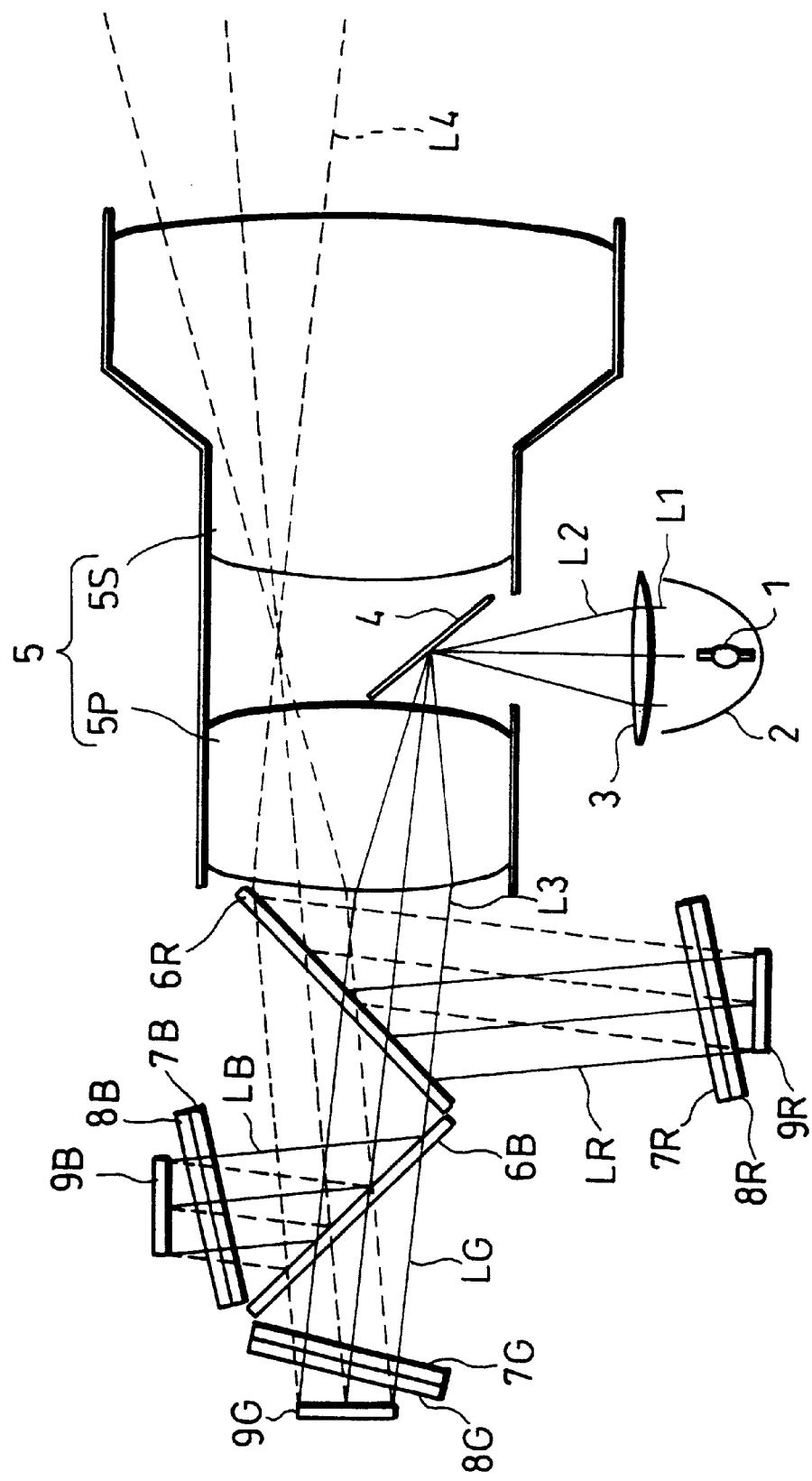
FIG. 1 is a schematic view illustrating an arrangement of a projection-type image display system in accordance with an embodiment of the present invention.

FIG. 1 is a schematic view illustrating an arrangement of a projection-type image display system in accordance with the present embodiment of the present invention. The projection-type image display system is provided with a light source section composed of a light source 1 and a paraboloidal mirror 2, a convergence lens 3 for converging light from the light source section, an illuminating light incidence mirror (illuminating light introducing means) 4, a projection lens 5, dichroic mirrors 6R and 6B, polarizing plates 7R, 7G, and 7B, λ/4 plates (phase difference plates) 8R, 8G, and 8B, reflection-type liquid crystal panels (reflection-type image display elements) 9R, 9G, and 9B, and a screen (not shown).

In the present embodiment, a 250 W metal halide lamp with an arc length of 3 mm is used as the light source 1. Alternatively, a halogen lamp or a xenon lamp may be used instead. Behind the light source 1, the paraboloidal mirror 2 is provided so that the light from the light source becomes substantially parallel.

The substantially parallel light L1 emitted from the light source section is converged by the convergence lens 3, thereby becoming a converged light L2. The converged light L2 enters the projection lens 5 sideways, and proceeds toward the illuminating light incidence mirror 4 provided at a pupil position of the projection lens 5. The projection lens 5 is composed of a panel-side lens group 5P positioned on the reflection-type liquid crystal panels 9R, 9G, and 9B side with respect to the pupil position, and a screen-side lens group 5S positioned on the screen side with respect to the pupil position. The light reflected by the illuminating light incidence mirror 4 goes through the panel-side lens group 5P, and becomes incident on the dichroic mirrors 6R and 6B.

Incidentally, a focal distance of the convergence lens 3 is set so that light having gone through the panel-side lens group 5P becomes a substantially parallel light L3. The illuminating light incidence mirror 4 is positioned in one of two pupil division regions which are obtained by dividing a pupil region of the projection lens 5, and the mirror 4 is adjusted so that the light having gone through the panel-side lens group 5 reaches the reflection-type liquid crystal panel 9G which is disposed on a center line of the projection lens 5.

Out of the light incident on the dichroic mirror 6R, only a red component is reflected. The red light LR reflected goes through the polarizing plate 7R and the λ/4 plate 8R, and thereafter, it becomes incident on the reflection-type liquid crystal panel 9R.

Out of the light having gone through the dichroic mirror 6R, light of a blue component is reflected by the dichroic mirror 6B. The blue light LB thus reflected is transmitted through the polarizing plate 7B and the λ/4 plate 8B, and thereafter, it becomes incident on the reflection-type liquid crystal panel 9B.

The green light LG having gone through the dichroic mirror 6B further goes through the polarizing plate 7G and the λ/4 plate 8G. and thereafter it becomes incident on the reflection-type liquid crystal panel 9G.

Incidentally, the dichroic mirrors 6R and 6B are provided at inclinations to the optical axis of the projection lens 5, in directions opposite to each other, respectively, so that aberrations thereof are cancelled each other.

The lights LR, LG, and LB thus incident on the reflection-type liquid crystal panels 9R, 9G, and 9B respectively are modulated, with their polarization directions changed in accordance with image information, and are reflected. Thereafter, the color lights LR, LG, and LB thus reflected go through the λ/4 plates 8R, 8G, and 8B and the polarizing plates 7R, 7G, and 7B, respectively, and are composited by the dichroic mirrors 6R and 6B, thereby becoming a projection light L4. The projection light L4 goes through the panel-side lens group 5P, and is once converged in the pupil division region in which the illuminating light incidence mirror 4 is not positioned, among the pupil division regions of the projection lens 5. Thereafter, it goes through the screen-side lens group 5S, thereby becoming projected on the screen not shown.

A 1.3-inch diagonal S-VGA (800×600 dots, 33×33 μm pixel pitch) whose display mode is a birefringence mode in which images are displayed by utilizing birefringence of the liquid crystal and controlling polarization directions of incident lights is adapted so as to be used as each of the liquid crystal panels 9R, 9G, and 9B.

The birefringence mode can be classified to a vertical alignment type in which liquid crystal molecules are aligned perpendicular to the panel surface, and a horizontal alignment type in which liquid crystal molecules are aligned parallel with the panel surface.

In a liquid crystal panel of the horizontal-alignment-type birefringence mode which exhibits birefringence even without application of a voltage, an alignment axis and a transmission axis of the polarizing plate are inclined at appropriate angles so that a black display is obtained when no voltage is applied thereto, that is, so that the liquid crystal panel is used in the normally black state. If, however, thickness of the liquid crystal layer is not uniform, the polarized state of reflected light varies, thereby making contrast irregular, upon the black display.

On the other hand, a liquid crystal panel of the vertical-alignment-type birefringence mode does not exhibits birefringence when no voltage is applied, whereas, when a voltage is applied, it exhibits birefringence in accordance with a voltage applied. In other words, such a liquid crystal panel exhibits a white display when no voltage is applied, that is, the panel is used in a normally white state. Therefore, in this case, if the thickness of the liquid crystal layer is not uniform, the polarized state of reflect light of the white display varies in accordance with the irregularities in thickness of the liquid crystal layer. Accordingly, the non-uniformness of the thickness of the liquid crystal layer affects relatively less the contrast ratio. Besides, the vertical-alignment-type liquid crystal panel has a good contrast ratio with respect to tilted incident light because of its structure.

In the present embodiment, the vertical-alignment-type liquid crystal panels are adapted to the projection-type image display system so as to be used as the reflection-type liquid crystal panels 9R, 9G, and 9B.

Figure 2:
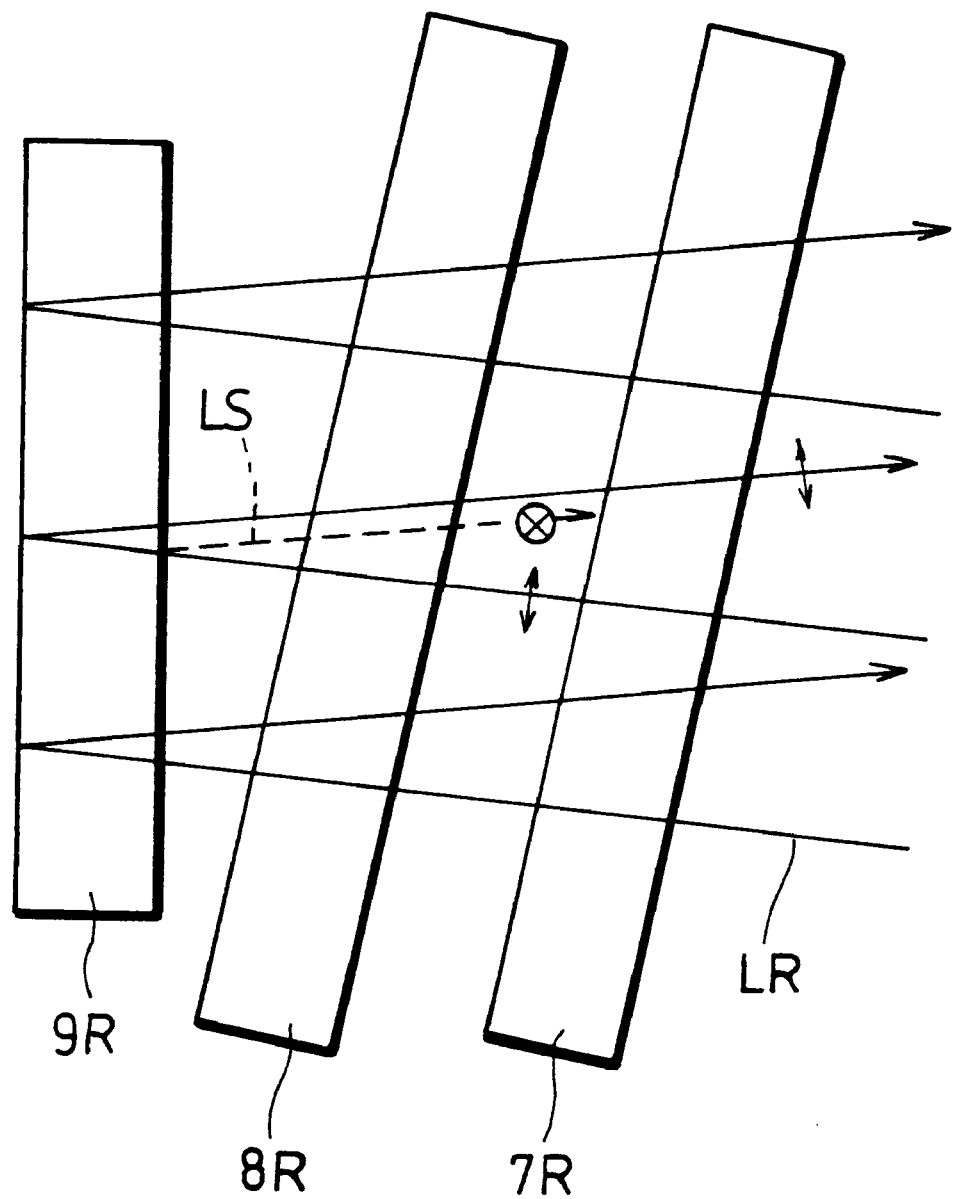
FIG. 2 is an enlarged view illustrating a part of the projection-type image display system, in which a reflection-type liquid crystal panel, a λ/4 plate, and a polarizing plate are provided.

FIG. 2 is an enlarged view illustrating a part where the polarizing plate 7R, the λ/4 plate 8R, and the reflection-type liquid crystal panel 9R are provided.

In dark display, the polarization direction of the red light LR is not modulated when it is reflected by the reflection-type liquid crystal panel 9R. Therefore, the red light LR enters the λ/4 plate 8R, becomes reflected by the reflection-type liquid crystal panel 9R, then again goes through the λ/4 plate 8R. Through this process, a plane of polarization of the red light revolves in a such direction that the original and resultant planes of polarization is symmetrical with respect to either a fast direction or a slow direction of the λ/4 plate 8R. Therefore, by providing the λ/4 plate 8R so that its fast direction or the slow direction is tilted at an angle of 45O with respect to the transmission axis of the polarizing plate 7R, the plane of polarization is revolved through 90°.

In other words, in dark display, the red light LR which went through the polarizing plate 7R and had a polarizing axis directed in one direction, comes to have a polarizing axis rotated through 90° when it is reflected by the reflection-type liquid crystal panel 9R and is incident on the polarizing plate 7R. Therefore, it cannot go through the polarizing plate 7R. As a result, most of the reflected light reflected by the reflection-type liquid crystal panel 9R in dark display is blocked by the polarizing plate 7R, resulting in that deterioration of contrast ratio of an image projected on the screen is prevented.

Incidentally, the same applies to display operations by the polarizing plates 7G and 7B, the λ/4 plates 8G and 8B, and the reflection-type liquid crystal panels 9G and 9B.

The following description will explain surface reflection by the reflection-type liquid crystal panels 9R, 9G, and 9B.

In the projection-type LCD device disclosed by Tokukaihei 4-194921, optical coupling needs to be realized to block a light reflected by a surface (hereinafter referred to as a surface-reflected light) of a liquid crystal panel provided therein, by filling a gap between a liquid crystal panel and a projection lens incorporating a color decompositing/compositing optical system with a substance having a refractive index equal to that of glass.

In the present embodiment, the polarizing plates 7R, 7G, and 7B, and the λ/4 plates 8R, 8G, and 8B are positioned on sides of the reflection-type liquid crystal panels 9R, 9G, and 9B which lights are incident on and reflected from, respectively, so that surface reflection caused by the reflection-type liquid crystal panels 9R, 9G, and 9B is prevented. In other words, since the polarization direction of a surface-reflected light LS reflected by surfaces of the reflection-type liquid crystal panels 9R, 9G, and 9B is by no means modulated, most of the surface-reflected lights LS are blocked by the polarizing plates 7R, 7G, and 7B, like the reflected light from the reflection-type liquid crystal panel 9R in dark display. This makes it possible to prevent the contrast ratio of the projected image on the screen from lowering due to the surface-reflected lights LS from the reflection-type liquid crystal panels 9R, 9G, and 9B.

As described above, with provision of the polarizing plates 7R, 7G, and 7B and the λ/4 plates 8R, 8G, and 8B, reflected lights from the reflection-type liquid crystal panels 9R, 9G, and 9B in dark display can be blocked, while the surface-reflected lights LS reflected by the surfaces of the reflection-type liquid crystal display panels 9R, 9G, and 9B can be blocked as well. Therefore, without the optical coupling which causes the structure of the device to become complicated, the contrast ratio of projected images can be prevented from lowering.

Further, the polarizing plates 7R, 7G, and 7B are inclined at an angle of about 100 with respect to the reflection-type liquid crystal panels 9R, 9G, and 9B, respectively, while the λ/4 plates 8R, 8G, and 8B are applied on surfaces of the polarizing plates 7R, 7G, and 7B on the reflection-type liquid crystal panels 9R, 9G, and 9B sides, respectively. With this arrangement, incidence of the surface-reflected lights from the polarizing plates 7R, 7G, and 7B and the λ/4 plates 8R, 8G, and 8B onto the projection lens 5 can be almost completely prevented. This will be explained in more detail below.

FIGS. 3(a) through 3(c) are explanatory views illustrating position relations among a lens L which is a one-piece lens imaginarily substituting the projection lens 5, a polarizing plate 7 corresponding to the polarizing plates 7R, 7G, and 7B, and the reflection-type liquid crystal panel 9 corresponding to the reflection-type liquid crystal panels 9R, 9G, and 9B.

As shown in FIG. 3(a), parallel light from the lens L is directly reflected by the reflection-type liquid crystal panel 9, and again enters the lens L. Here, a maximum angle of incidence to the reflection-type liquid crystal panel 9 is equivalent to a light receiving angle of the lens L. In other words, a triangle (hatched region in FIG. 3(b)) formed by the incident light and the reflected light represents an F number of the lens L. More specifically, let a side of the foregoing triangle parallel with a surface of the lens L be the base thereof, and the following relationship is obtained:

$$F = h/a = f/\phi$$

where a represents a length of the base, h represents a height of the triangle, f represents a back focal distance, and φ represents an effective aperture of the lens L.

Figure 3:
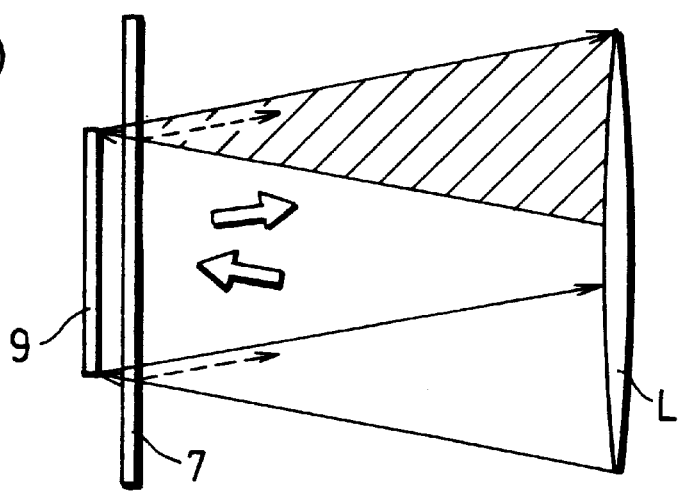
FIGS. 3(a) through 3(c) are explanatory views illustrating position relationship among a one-piece lens imaginarily substituting the projection lens of the projection-type image display system, the polarizing plate, and the reflection-type liquid crystal panel.
Figure 3:
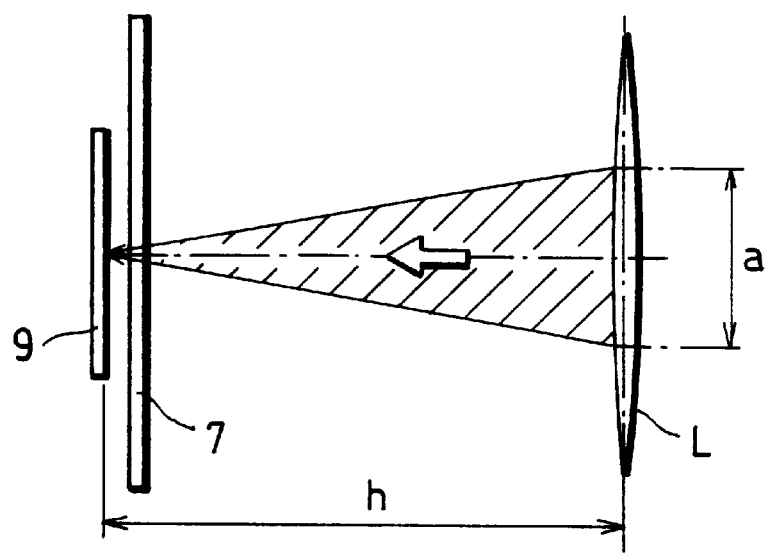
Figure 3:
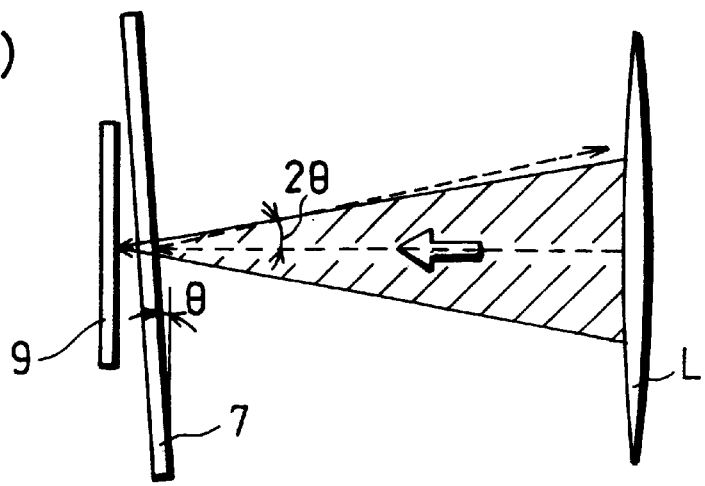

To be more specific, let a point in the reflection-type liquid crystal panel 9 be the vertex of the triangle, and among light reflected at the foregoing point, only the light going through the hatched region shown in FIG. 3(*b*) can reach the screen through the lens L. Actually, illuminating light is not completely parallel but diffused to some extent, and such illuminating light is incident from either above or below a center line (an optical axis of the lens L) of the hatched region.

Therefore, the polarizing plate 7 is inclined with respect to the reflection-type liquid crystal panel 9 so that the light perpendicularly incident on the reflection-type liquid crystal panel 9 is reflected by the surface of the polarizing plate 7 toward outside the triangle hatched region as shown in FIG. 3(*c*). In other words, the following relation should be satisfied:

$$2\theta > \tan^{-1}(a/2h)$$

where $\theta$ represents an angle formed by the surface of the polarizing plate 7 and the reflection-type liquid crystal panel 9. In other words, the surface-reflected light from the polarizing plate 7 is prevented from going through the lens L and reaching the screen, by setting $\theta$ so that the following relationship is satisfied:

$$\theta > (\tfrac{1}{2}) \cdot \tan^{-1}(\tfrac{1}{2}F)$$

Since the F number of the projection lens 5 used in the present embodiment is 1.4, the polarizing plates 7R, 7G, and 7B may be inclined at an angle of about 10° as described above, which is found from the relation expressed by the above formula.

As has been described above, in the projection-type image display system in accordance with the present embodiment, the polarizing plates 7R, 7G, and 7B are inclined with respect to the reflection-type liquid crystal panels 9R, 9G, and 9B. Therefore, the surface-reflected lights from the polarizing plates 7R, 7G, and 7B no longer go through the projection lens 5 and reach the screen. As a result, deterioration of the contrast ratio of the projected image can be prevented.

Furthermore, since the λ/4 plates 8R, 8G, and 8B are provided between the polarizing plates 7R, 7G, and 7B and the reflection-type liquid crystal panels 9R, 9G, and 9B, respectively, the reflected lights from the reflection-type liquid crystal panels 9R, 9G, and 9B in dark display no longer enter the projection lens 5. Therefore, deterioration of the contrast ratio of the projected image can be further prevented. Incidentally, since the λ/4 plates 8R, 8G, and 8B are applied on the polarizing plates 7R, 7G, and 7B, the surface-reflected lights from the λ/4 plates 8R, 8G, and 8B, like those from the polarizing plates 7R, 7G, and 7B, do not enter the projection lens 5.

Furthermore, since the provision of the λ/4 plates 8R, 8G, and 8B also ensures that the surface-reflected lights from the reflection-type liquid crystal panels 9R, 9G, and 9B are blocked, there is no need to provide the reflection-type liquid crystal panels 9R, 9G, and 9B at a tilt with respect to the projection lens 5.

The following description will explain the λ/4 plates 8R, 8G, and 8B in more detail. Generally, regarding each color, the λ/4 plate advances (delays) by λ/4 a phase of a light wave with a central wavelength), but in the case where a light wave to be advanced (delayed) has a wavelength deviating from the central wavelength, a phase advanced (delayed) deviates from λ/4 as well. Therefore, the λ/4 plate has a degraded function with respect to such a wave with a wavelength deviating from the central wavelength, thereby causing the contrast ratio to lower.

Figure 4:
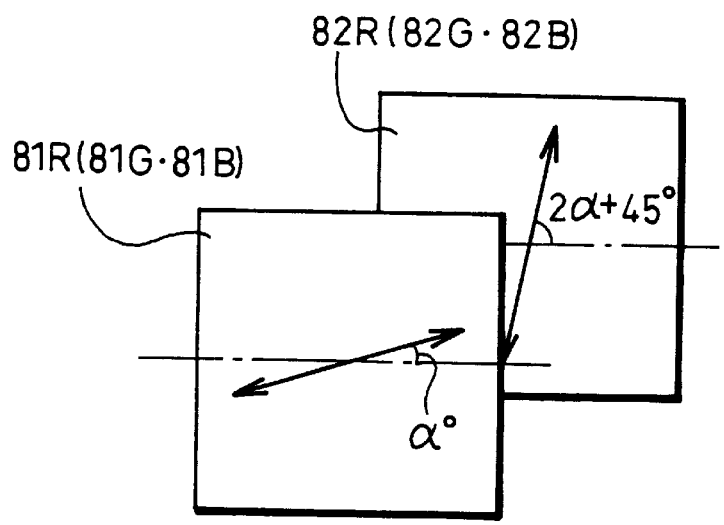
FIG. 4 is a schematic view illustrating fast (slow) directions of two phase difference plates provided in the projection-type image display system.
Figure 5:
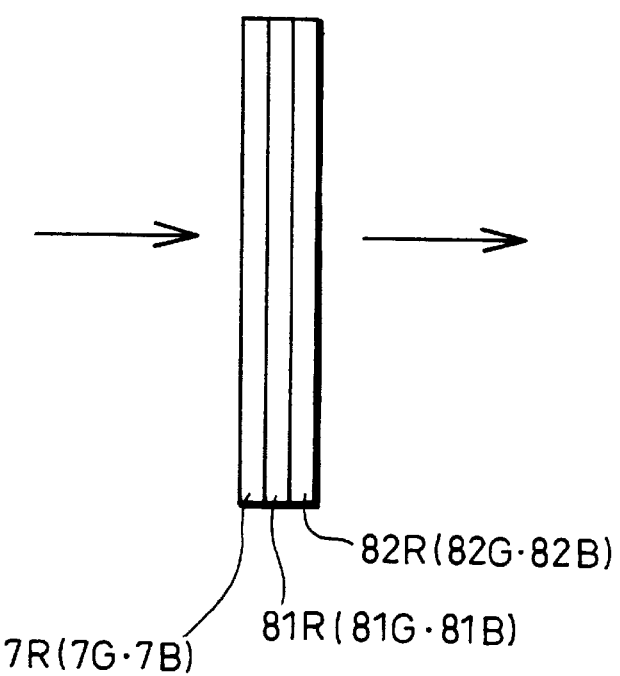
FIG. 5 is a side view illustrating a state in which the two phase difference plates are laminated on the polarizing plate.

Then, in the place of the foregoing λ/4 plate 8R (8G, 8B), a pair of phase difference plates 81R (81G, 81B) and 82R (82G, 82B) as shown in FIGS. 4 and 5 is used, being laminated on the polarizing plate 7R (7G, 7B). With this arrangement, a wavelength range in which they substantially function as the λ/4 plate is expanded. Incidentally, FIG. 4 is a schematic view illustrating fast (slow) directions of the phase difference plates 81R (81G, 81B) and 82R (82G, 82B), and FIG. 5 is a side view illustrating a state in which the two phase difference plates 81R (81G, 81B) and 82R (82G, 82B) are laminated on each other and applied to the polarizing plate 7R (7G, 7B). In FIG. 5, arrows indicate directions in which the light from the projection lens 5 enters thereto and outgoes therefrom.

"ACHROMATIC COMBINATIONS OF BIREFRINGENT PLATES" in "The Proceedings of the Indian Academy of Sciences, Vol.XLI, No.4, Sec.A (1995)" discloses that a plurality of phase difference plates laminated on one another are capable of approximately functioning as a one-piece λ/4 plate with respect to a light wave with a wavelength deviating from the central wavelength to some extent. In the optical system of the present embodiment, however, actually the reflection-type liquid crystal panels 9R, 9G, and 9B in a normal state produce phase differences more or less even when no voltage is applied thereto, since the liquid crystal molecules are tilted to some extent. Therefore, considering the reflection-type liquid crystal panels 9R, 9G, and 9B as parts of the phase difference plates laminated on each other, respective combinations of the reflection-type liquid crystal panels 9R, 9G, and 9B and the phase difference plates laminated thereon function as λ/4 plates. With this arrangement, expansion of the wavelength range is enabled, and an approximate function of causing a phase difference of λ/4 can be performed with respect to even a light wave which has a wavelength more or less deviating from a central wavelength. As a result, the contrast ratio can be further improved.

In the present embodiment, retardation amounts of the phase difference plates 81R, 81G, and 81B provided on the projection lens 5 side are set to about λ/2, while retardation amounts of the phase difference plates 82R, 82G, and 82B provided on the reflection-type liquid crystal panels 9R, 9G, and 9B sides are set to about λ/4.

Then, as shown in FIG. 4, the phase difference plate 81R (81G, 81B) as a λ/2 plate is provided so that its fast (slow) direction is inclined at an angle of $\alpha°$ with respect to the polarizing axis of the polarizing plate 7R (7G, 7B), while the phase difference plate 82R (82G, 82B) as a λ/4 plate is provided so that its fast (slow) direction is inclined at an angle of $(2\alpha+45)°$ with respect to the polarizing axis of the polarizing plate 7R (7G, 7B). The two phase difference plates 81R (81G, 81B) and 82R (82G, 82B) are laminated on each other and provided so as to satisfy the foregoing requirements. With this arrangement, after a polarization state of light having been transmitted through the phase difference plate 81R (81G, 81B) serving as the λ/2 plate is rotated through an angle of $2\alpha(°)$ of longitude along the equator of the Poincaré sphere, the light becomes incident on the phase difference plate 82R (82G, 82B) serving as the λ/4 plate. Then, by further revolving the phase difference plate 82R (82G, 82B) as the λ/4 plate through an angle of 45°, the polarization state of the outgoing light is shifted to a pole of the Poincaré sphere. Consequently, the phase difference plates thus laminated on one another as a whole serve as the λ/4 plate.

In this arrangement, the performance do not have to be achieved by the phase difference plates alone, but the optical system is preferably designed with a rubbing direction and a pretilt angle of the reflection-type liquid crystal panels 9R, 9G, and 9B taken into consideration so that optimal performance can be obtained by the optical system including the reflection-type liquid crystal panels 9R, 9G, and 9B.

More specifically, reflection-type liquid crystal panels 9R, 9G, and 9B whose rubbing direction is 0° and in which a pretilt angle of liquid crystal molecules is 3° were used in optical ray tracing, and a good result was obtained in the case where optical ray simulation was performed by inclining fast (slow) directions of the liquid crystal panels at an angle in a range of 15° to 19° with respect to the fast (slow) directions of the reflection-type liquid crystal panels 9R, 9G, and 9B, respectively, and further, slightly reducing retardation amount thereof (by several nanometers).

In the optical ray simulation, the central wavelengths of red, green and blue colors were set to 620 nm, 550 nm, and 450 nm. Further, angles at which the fast (slow) directions of the phase difference plates 81R and 82R are inclined with respect to the transmission axis of the polarizing plate 7R were set to 17° and 79°, respectively, those of the phase difference plates 81G and 82G with respect to that of the polarizing plate 7G were set to 17° and 79°, respectively, and those of the phase difference plates 81B and 82B with respect to that of the polarizing plate 7B were set to 16.5° and 78°, respectively.

Figure 7:
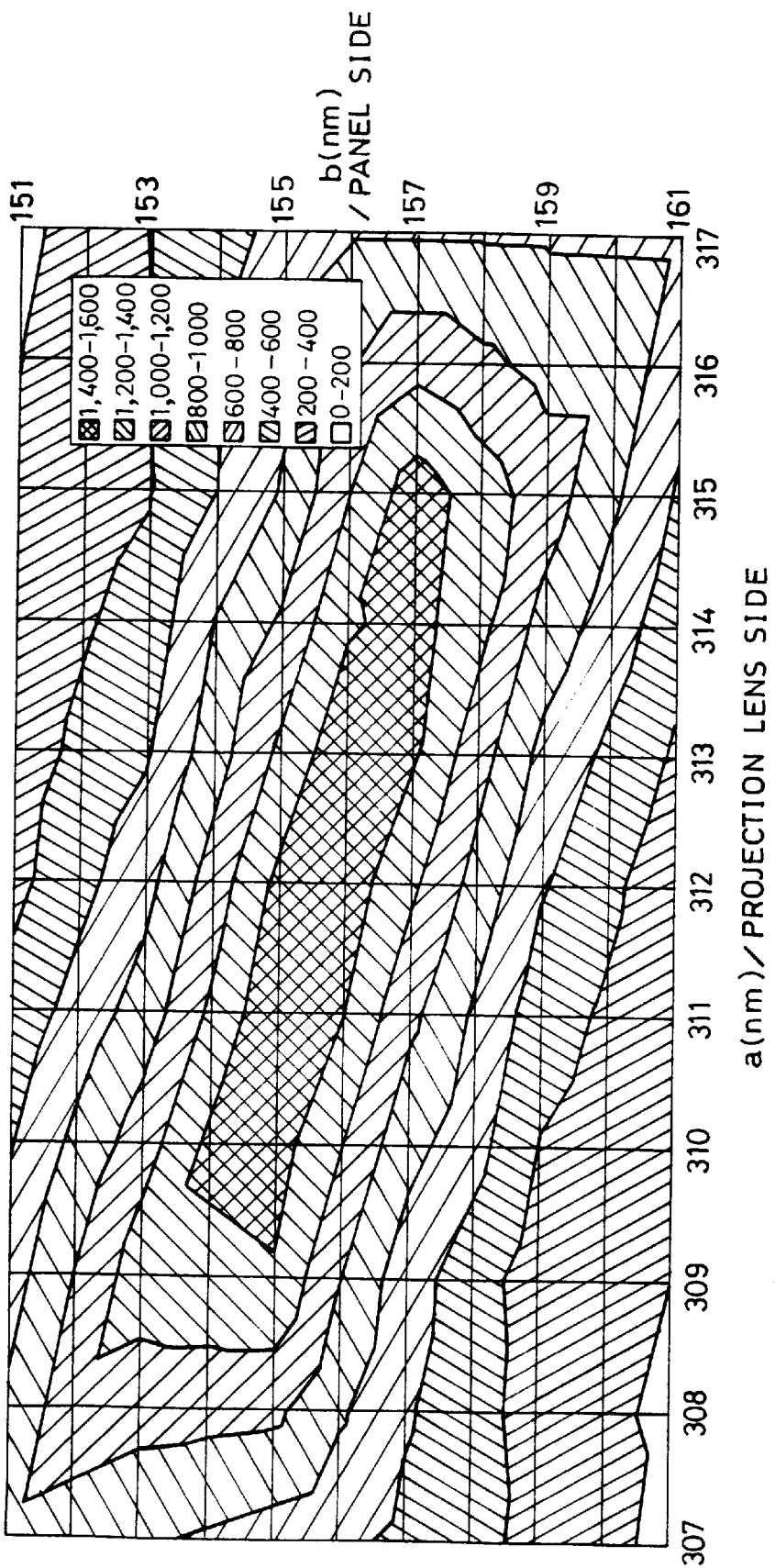
FIG. 7 is a graph illustrating distribution of the contrast ratio in the case where a retardation amount of a phase difference plate for light with a red color central wavelength is varied.
Figure 8:
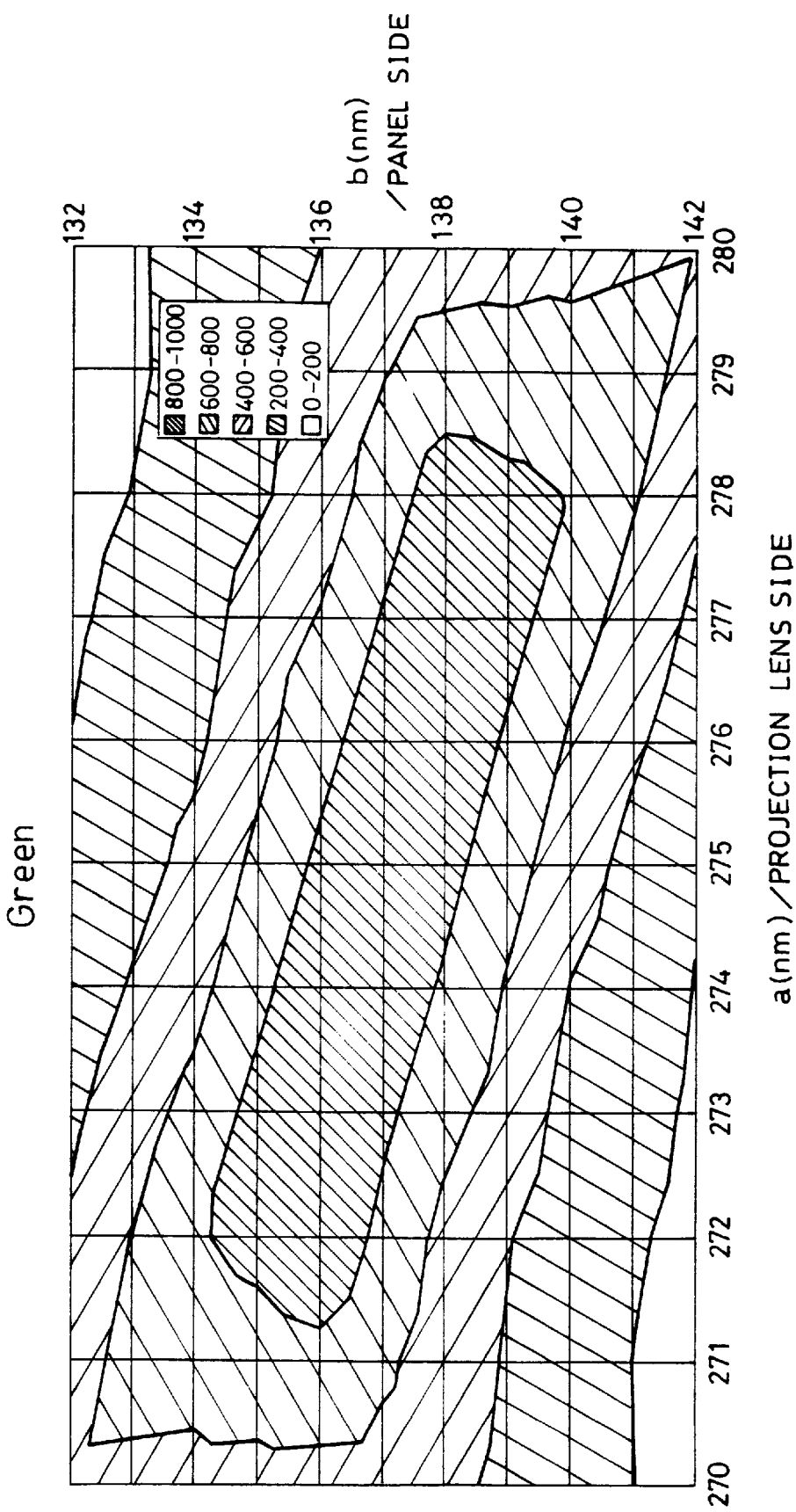
FIG. 8 is a graph illustrating distribution of the contrast ratio in the case where a retardation amount of a phase difference plate for light with a green color central wavelength is varied.
Figure 9:
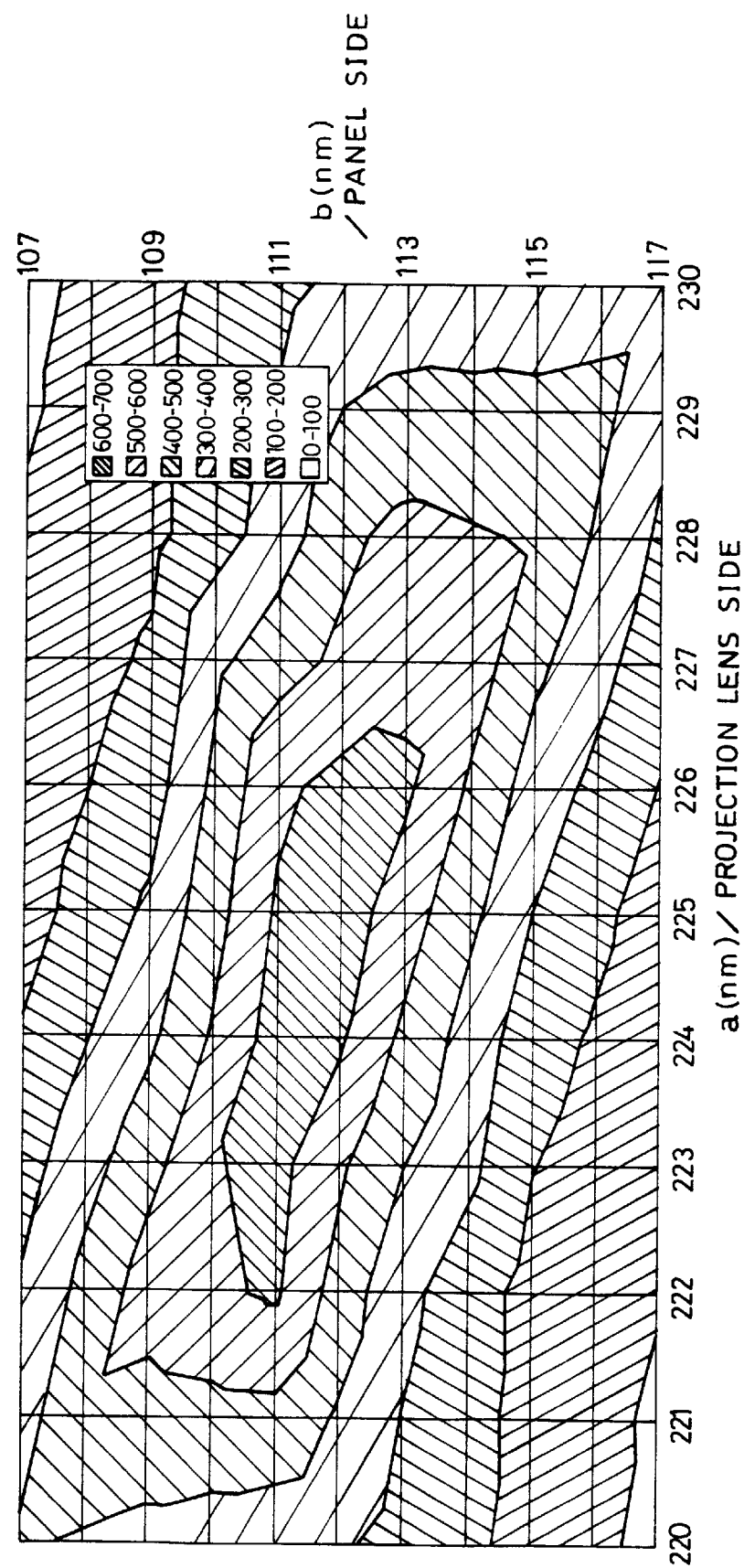
FIG. 9 is a graph illustrating distribution of the contrast ratio in the case where a retardation amount of a phase difference plate for light with a blue color central wavelength is varied.

With the foregoing settings, retardation amounts of the phase difference plates were varied, and contrast ratios were determined regarding each combination of the retardation amounts. Results of the experiments are shown in FIGS. 7 through 9. In FIGS. 7 through 9, retardation amounts of the phase difference plates 81R, 81G, and 81B on the projection lens 5 side are plotted as abscissas, respectively, while retardation amounts of the phase difference plates 82R, 82G, and 82B on the reflection-type liquid crystal panels 9R, 9G, and 9B sides are plotted as ordinates, respectively. FIGS. 7, 8, and 9 illustrate contrast ratio distribution of the phase difference plates 81R and 82R, that of the phase difference plates 81G and 82G, and that of the phase difference plates 81B and 82B, respectively.

From the contrast ratio distribution shown in FIGS. 7, 8, and 9, the following relation should be satisfied:

$$0.6 \times a - 5 - \lambda/20 < b < 0.6 \times a + 5 - \lambda/20$$

where $\lambda$ represents a central wavelength (nm) of a transmissible light band, a represents a retardation amount (nm) of the phase difference plate 81R, 81G, or 81B, and b represents a retardation amount (nm) of the phase difference plate 82R, 82G, or 82B. When the foregoing relation is satisfied, the function of the $\lambda/4$ plate is hardly degraded and a projected image with a satisfactory contrast ratio can be obtained, even if the retardation amounts of the phase difference plates 81R, 81G, and 81B and those of the phase difference plates 82R, 82G, and 82B vary more or less.

For example, in the case where the retardation amounts of the phase difference plates 81R, 82R, 81G, 82G, 81B, and 82B are set to 310 nm, 155 nm, 275 nm, 137 nm, 225 nm, and 112 nm, respectively, variation of the contrast ratio of the projected image due to variation occurring in mass production can be suppressed. More specifically, it was confirmed that the contrast ratio hardly varied when the retardation amounts of the phase difference plates 82R, 82G, and 82B vary in a range of about ±5 nm.

Figure 6:
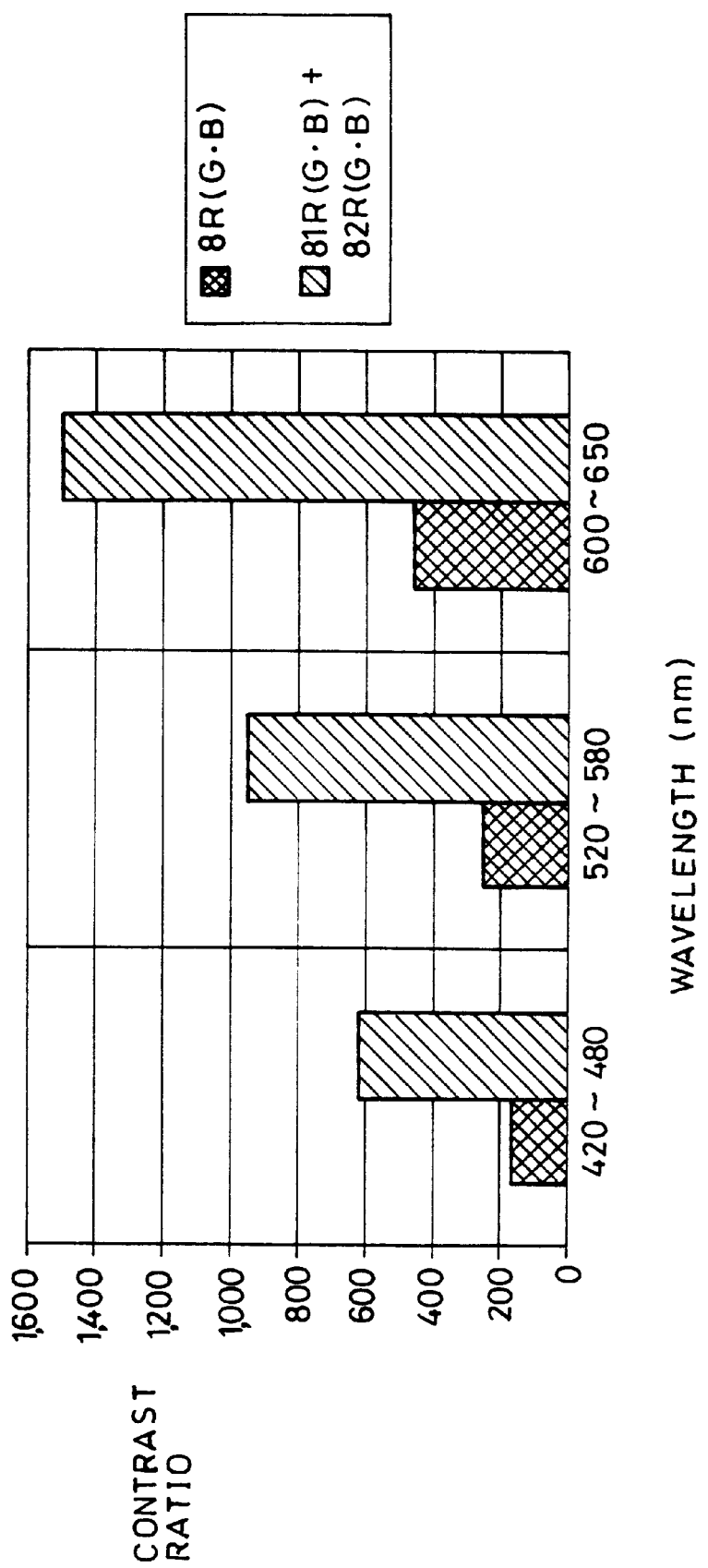
FIG. 6 is a graph showing average contrast ratios obtained with respect to each color with a wavelength in the vicinity of its central wavelength, in the case where one λ/4 plate is provided and in the case where two phase difference plates are provided.

Furthermore, FIGS. 7, 8, and 9 show the contrast ratios of the red, green, and blue color lights with central wavelengths, respectively, but actually, regarding each color, a light with a wavelength in the vicinity of the central wavelength is used. FIG. 6 shows respective averages of the contrast ratios in the case where the $\lambda/4$ plates 8R, 8G, and 8B are provided and in the case where the pairs of the phase difference plates 81R and 82R, 81G and 82G, and 81B and 82B are provided. As clear from FIG. 6, the contrast ratio is improved in the case where the pairs of the phase difference plates 81R and 82R, 81G and 82G, and 81B and 82B are provided, as compared with the case where the $\lambda/4$ plates 8R, 8G, and 8B are provided.

Thus, the projection-type image display system in accordance with the present embodiment is capable of providing images with higher contrast ratios than a liquid crystal projector using a conventional polymer-diffusion-type liquid crystal does, and is not affected by birefringence inherent to glass constituting an optical element such as a PBS, unlike a conventional video projection device. Accordingly, the projection-type image display system is capable of providing projected images with a high contrast ratio and good image quality, and is made smaller in size and lighter in weight.

As described above, the projection-type image display system in accordance with the present embodiment may be also arranged so that the reflection-type image display element is a liquid crystal panel which modulates the polarization direction of incident light and is equipped with a polarizing plate.

In the foregoing arrangement, by arranging the liquid crystal panels so that, for example, the liquid crystal panels modulate the polarization directions of incident lights so that reflected lights go through the polarizing plates in bright display and do not go therethrough in dark display, contrast between bright display and dark display can be surely achieved. As a result, projected images with high image quality can be provided.

Furthermore, the foregoing projection-type image display system may be arranged so that the polarizing plates are inclined with respect to the liquid crystal panels.

With the foregoing arrangement in which the polarizing plates are inclined with respect to the liquid crystal panels, surface-reflected lights from the polarizing plates are reflected in directions different from the directions in which the reflected lights modulated by the liquid crystal panels are directed. Therefore, the surface-reflected lights from the polarizing plates proceed in directions different from those of the projection lights to form an image, and hence the contrast ratio of the projected image does not deteriorate. As a result, the projected image has good image quality.

Furthermore, the foregoing projection-type image display system may be arranged so that the following relationship is satisfied:

$$\theta > (\tfrac{1}{2}) \cdot \tan^{-1}(\tfrac{1}{2}F)$$

where $\theta$ represents an angle at which the polarizing plate is inclined with respect to the liquid crystal panel, and F represents an F number of the projection lens.

By inclining the polarizing plates with respect to the liquid crystal panels at such an angle $\theta$ as satisfies the foregoing expression, the surface-reflected lights from the polarizing plates in no way go through the projection lens thereby being projected. As a result, deterioration of the contrast ratio of the projected images can be more surely prevented.

Furthermore, the foregoing projection-type image display system may be arranged so that phase difference plates are provided between the liquid crystal panels and the polarizing plates, respectively.

In the foregoing arrangement, for example, a λ/4 plate may be used as each phase difference plate in a manner such that the fast or slow direction thereof is inclined at an angle of 45° with respect to a transmission axis of each polarizing plate. In this case, in dark state, incident light having a certain polarization direction as a result of transmission through the polarizing plate goes through the λ/4 plate and is reflected by the liquid crystal panel without modulation of the polarization direction, then, goes through the λ/4 plate again. As a result, the light comes to have a polarization direction rotated through an angle of 90° as compared with the polarization direction upon incidence. Therefore, since the reflected light from the liquid crystal panel in dark display is not transmitted through the polarizing plate, the deterioration of the contrast ratio of the projected images can be prevented.

Furthermore, regarding the surface-reflected lights from the liquid crystal panels, their polarization directions are in no way modulated upon the surface reflection. Therefore, the surface-reflected lights are not transmitted by the polarizing plates, like the reflected light from the liquid crystal panels in dark display. As a result, the deterioration of the contrast ratio of the projected images can be further prevented.

More specifically, by using the λ/4 plates as the phase difference plates, the normally black display wherein the reflected lights from the liquid crystal panels in dark display and the surface-reflected lights from the liquid crystal panels are both cut off can be realized.

Furthermore, the foregoing projection-type image display system may be arranged so that the phase difference plates are inclined with respect to the liquid crystal panels.

With the foregoing arrangement in which the phase difference plates are inclined with respect to the liquid crystal panels, the surface-reflected lights from the phase difference plates are directed in directions different from the directions in which the reflected lights which have been modulated by the liquid crystal panels are directed. Therefore, the surface-reflected lights from the phase difference plates proceed in different directions from the directions of projection lights to form an image. Consequently, the contrast ratio of projected images never deteriorates, whereby the projected images have good image quality.

Furthermore, the foregoing projection-type image display system may be arranged so that the following relationship is satisfied:

$$\theta > (\frac{1}{2}) \cdot \tan^{-1}(\frac{1}{2F})$$

where θ represents an angle at which each phase difference plate is inclined with respect to the corresponding liquid crystal panel, and F represents an F number of the projection lens.

By inclining the phase difference plates with respect to the liquid crystal panels at such an angle as satisfies the foregoing expression, the surface-reflected lights from the phase difference plates are in no way transmitted through the projection lens and projected, whereby the deterioration of the contrast ratio can be further prevented.

Furthermore, the projection-type image display system may be arranged so that each phase difference plate is composed of a plurality of phase difference plate pieces laminated on one another.

According to the foregoing arrangement, a plurality of phase difference plates are laminated on one another and phase differences produced by the liquid crystal panels are utilized. Therefore, it is possible to make even a light wave which has a wavelength more or less deviating from a desirable central wavelength of a transmissible light band have a phase difference of approximately λ/4. Accordingly, even if light having more or less widely ranging wavelengths is incident, projected images with sufficiently high contrast ratios can be provided.

Furthermore, the foregoing projection-type image display system is arranged so that (i) each phase difference plate is composed of two phase difference plate pieces, (ii) a retardation amount of one of the phase difference plate pieces disposed on the polarizing plate side is set to about λ/2 (nm) and a retardation amount of the other phase difference plate piece disposed on the liquid crystal panel side is set to about λ/4 (nm) where λ represents a central wavelength of the desired transmissible light band, and (iii) the phase difference plate pieces are disposed in a manner such that the fast or slow direction of the phase difference plate piece with the retardation amount of λ/2 (nm) is rotated through an angle of α(°) with respect to the transmission axis of the corresponding polarizing plate, while the fast or slow direction of the phase difference plate piece with the retardation amount of λ/4 (nm) is rotated through an angle of 2×α+45(°) with respect to the transmission axis of the corresponding polarizing plate.

With the foregoing arrangement, after a polarization state of light having been transmitted through the phase difference plate piece with the retardation amount of λ/2 (nm) becomes a state in which the polarization direction is rotated through an angle of 2α(°) of longitude along the equator of the Poincaré sphere, the light becomes incident on the phase difference plate piece with the retardation amount of λ/4 (nm). Then, by further revolving the phase difference plate piece with the retardation of λ/4 (nm) through an angle of 45°, the polarization state of the outgoing light is shifted to a pole of the Poincaré sphere. Consequently, the phase difference plate pieces thus laminated on each other as a whole serve as the λ/4 plate.

Furthermore, the projection-type image display system may be arranged so that (i) each phase difference plate is composed of two phase difference plate pieces, and (ii) the following relationship is satisfied:

$$0.6 \times a - 5 - \lambda/20 < b < 0.6 \times a + 5 - \lambda/20$$

where λ represents a central wavelength (nm) of a desired transmissible light band, a represents a retardation amount (nm) of the phase difference plate piece provided on the polarizing plate side, and b represents a retardation amount (nm) of the phase difference plate piece provided on the liquid crystal panel side.

With the foregoing arrangement, the function as the λ/4 plate is hardly degraded and deterioration of the contrast ratio of a projected image can be prevented, even if the retardation amounts of the phase difference plate pieces vary more or less. In other words, variation of the contrast ratio of the projected image which stems from variation of each retardation of the phase difference plate piece occurring in mass production of the same can be suppressed.

[Second Embodiment]

Figure 10:
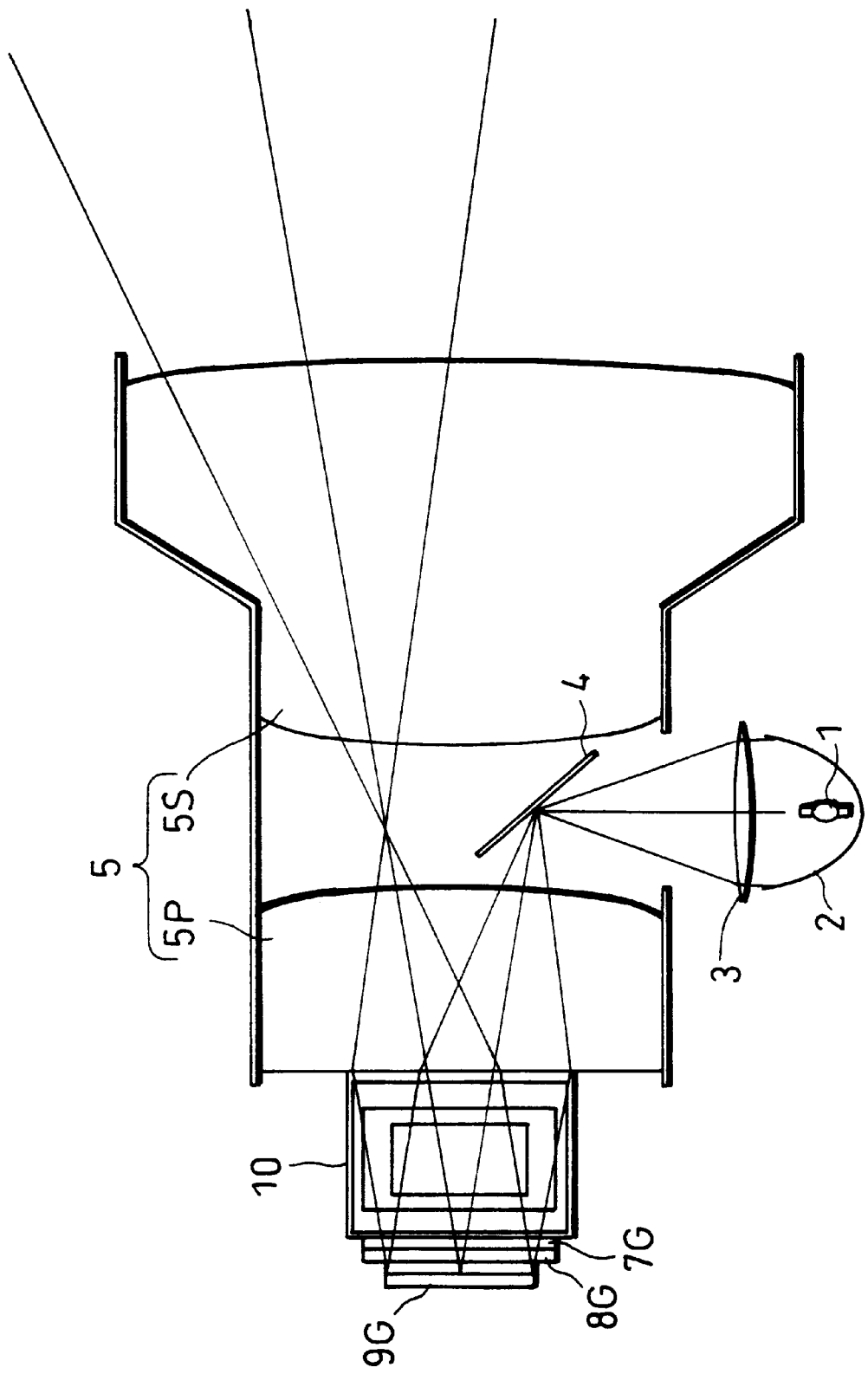
FIG. 10 is a schema tic view illustrating an arrangement of a projection-type image display system in accordance with another embodiment of the present invention.
Figure 11:
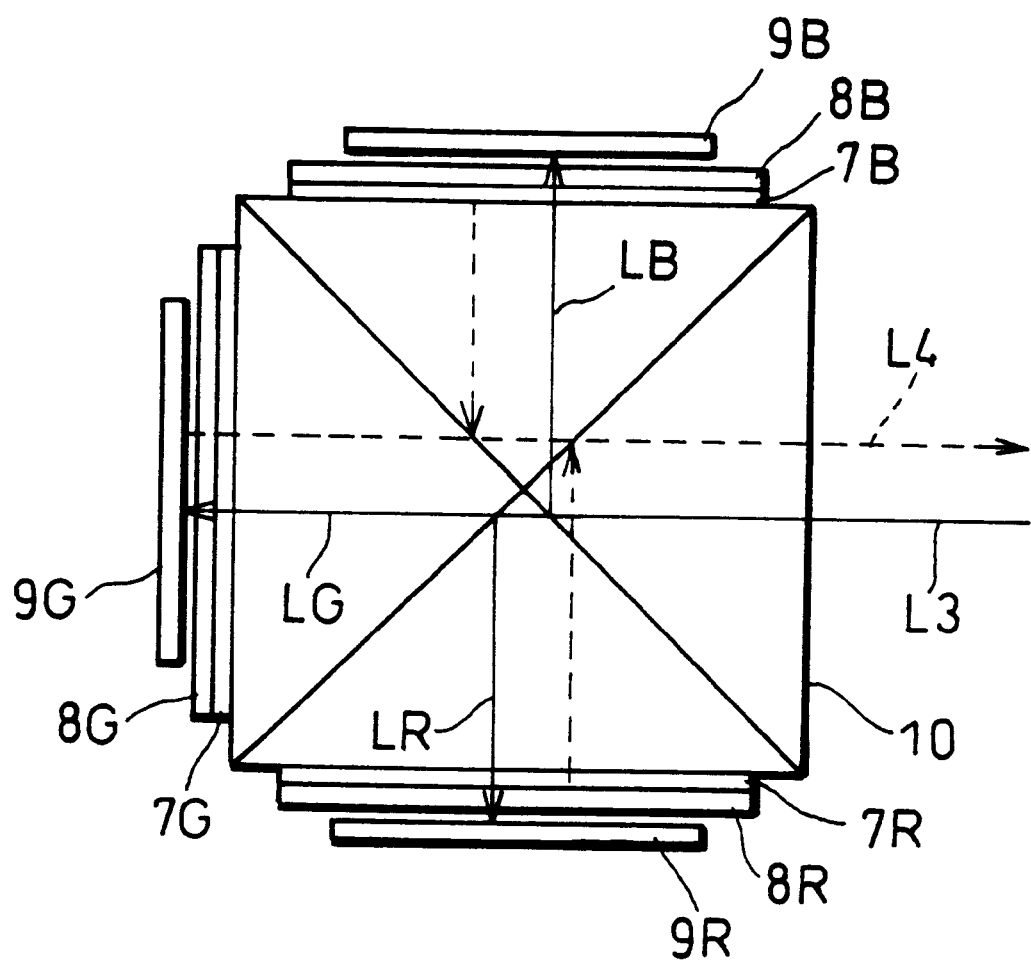
FIG. 11 is an enlarged view illustrating a part of the projection-type image display system, in which a cross dichroic prism, reflection-type liquid crystal panels, polarizing plates, and λ/4 plates are provided.
Figure 12:
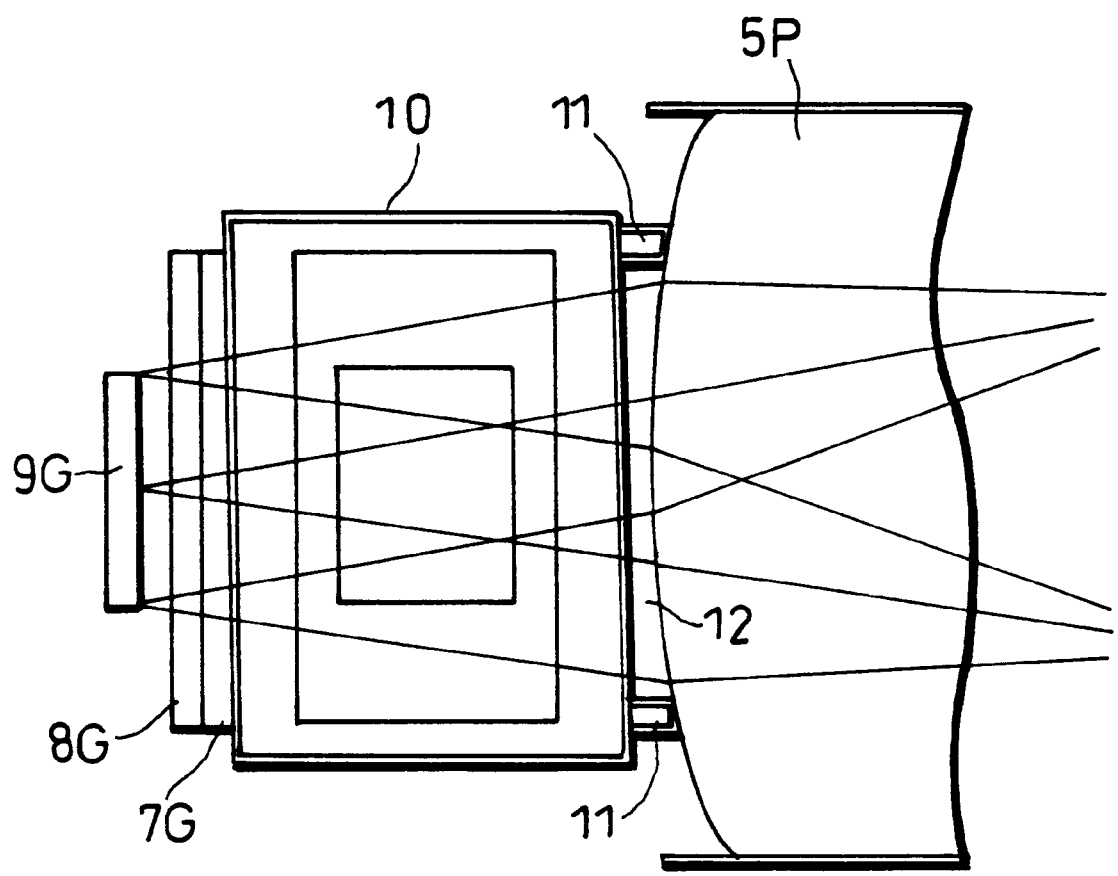
FIG. 12 is an enlarged view illustrating an example of optical coupling between a projection lens and the cross dichroic prism in the projection-type image display system.
Figure 13:
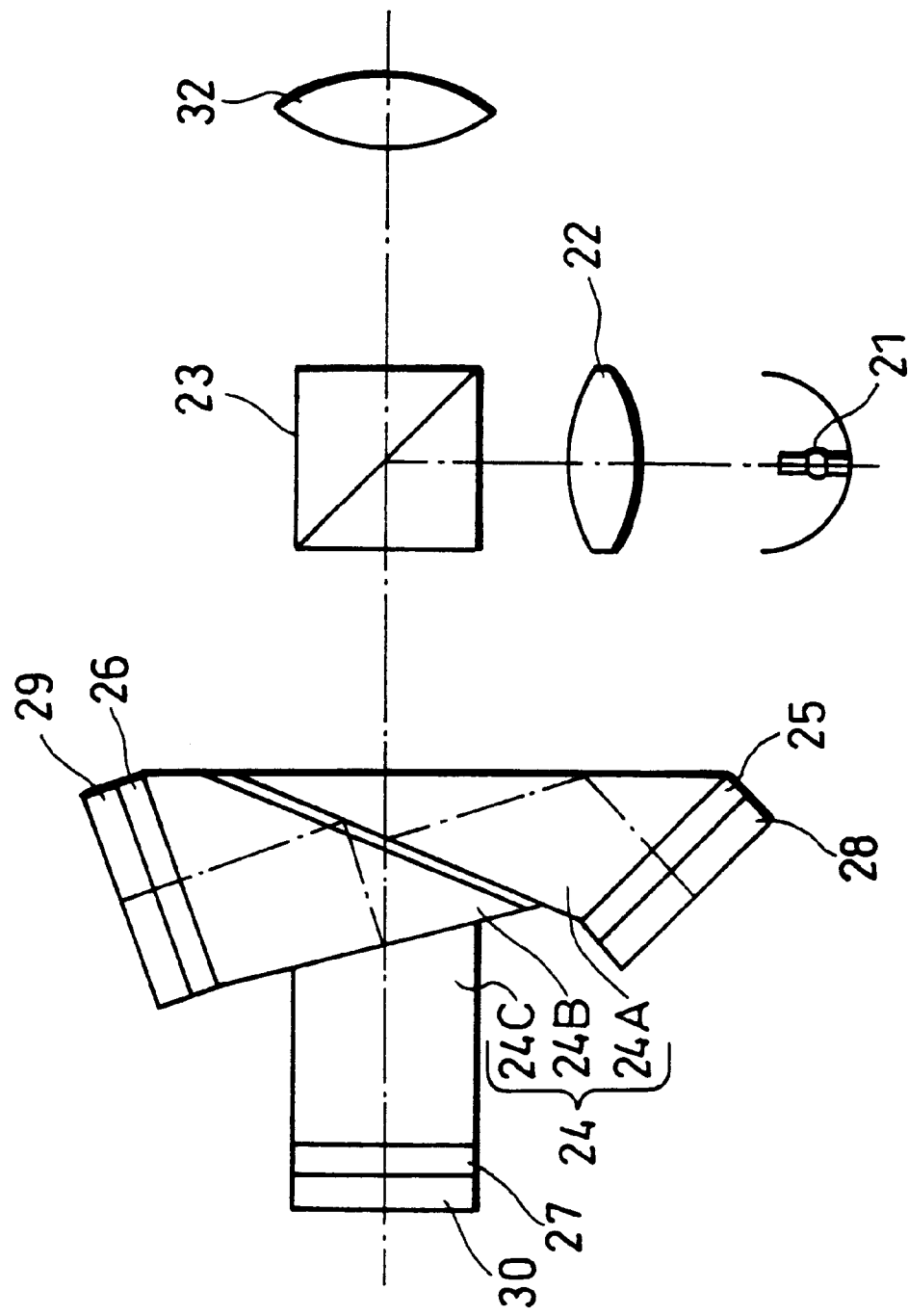
FIG. 13 is a schematic view illustrating an arrangement of a conventional video projection device.
Figure 14:
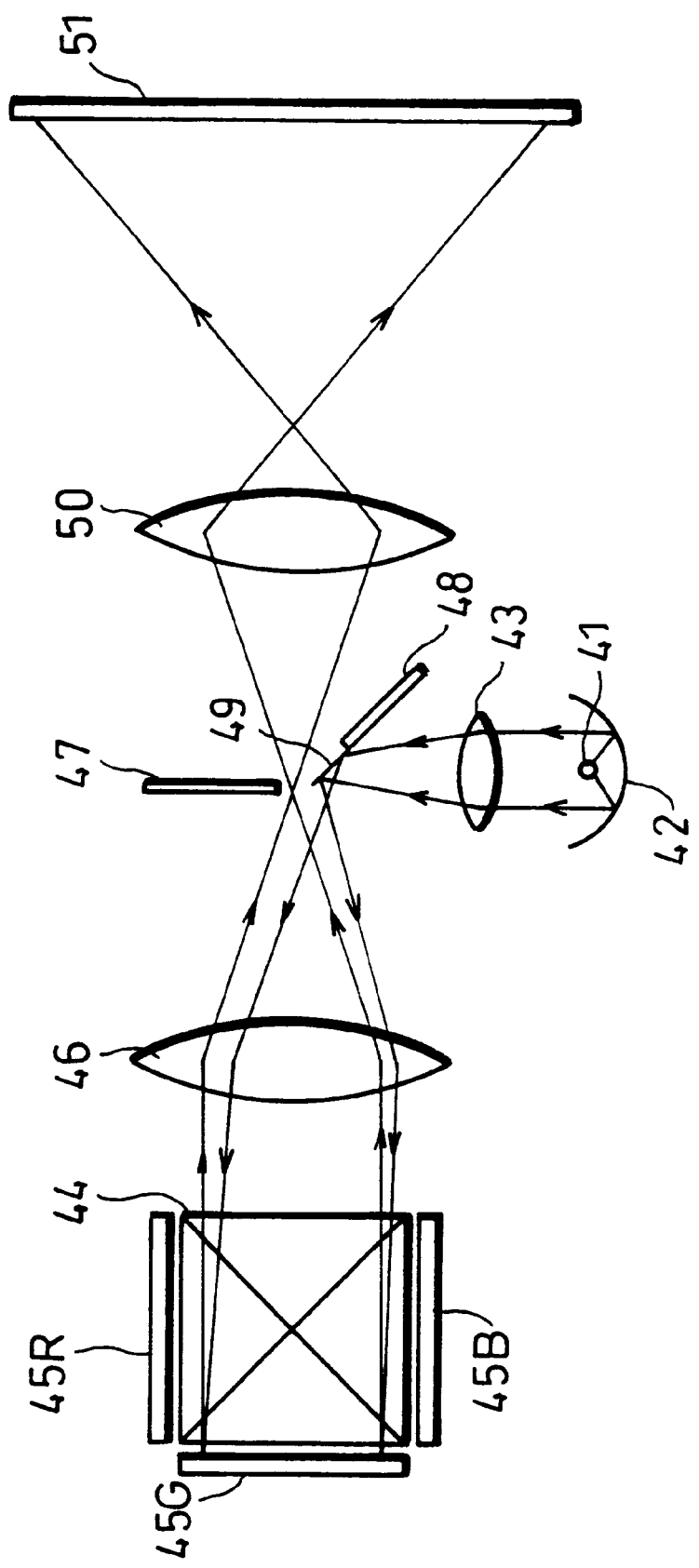
FIG. 14 is a schematic view illustrating an arrangement of a conventional projection-type liquid crystal display device.
Figure 15:
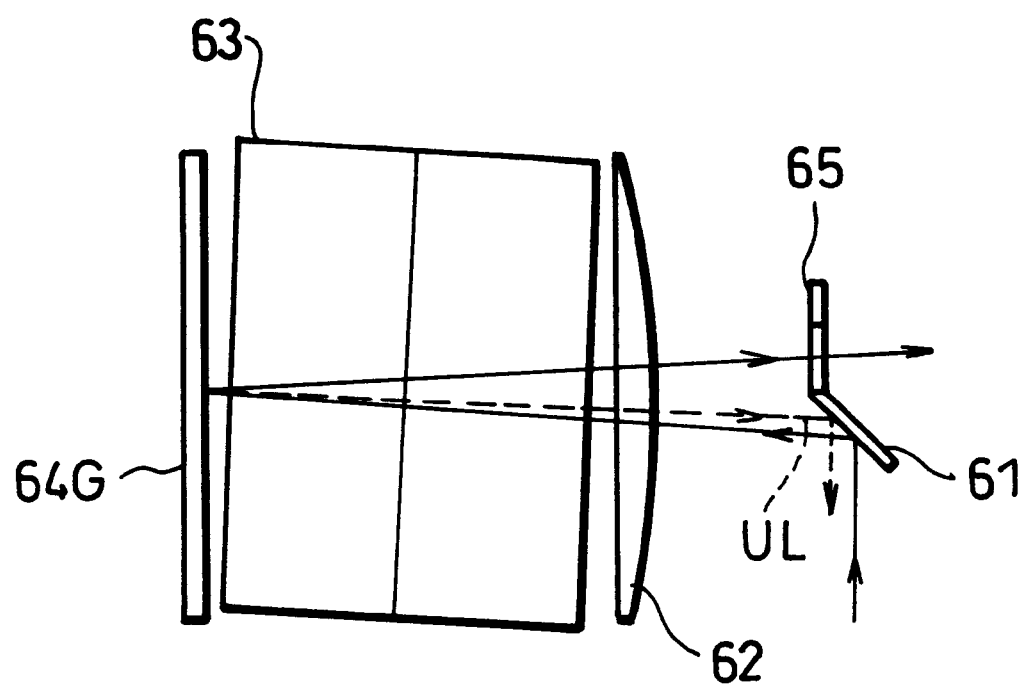
FIG. 15 is a schematic view illustrating an arrangement of a conventional liquid crystal projector.

The following description will explain another embodiment of the present invention while referring to FIGS. 10 through 12. The members having the same structure (function) as those in the above-mentioned first embodiment will be designated by the same reference numerals and their description will be omitted.

FIG. 10 is a schematic view illustrating a schematic arrangement of a projection-type image display system in accordance with the present embodiment of the present invention. This projection-type image display system includes a light source section composed of a light source 1 and a paraboloidal mirror 2, a convergence lens 3 for converging light from the light source section, an illuminating light incidence mirror 4, and a projection lens 5, which are substantially same as those in the first embodiment. The dichroic mirrors 6R and 6B in the first embodiment are replaced with cross dichroic prism 10 in the present embodiment, on which the polarizing plates 7R, 7G, and 7B, the λ/4 plates 8R, 8G, and 8B, and the reflection-type liquid crystal panels 9R, 9G, and 9B are mounted.

The panel-side lens group 5P is arranged so that surfaces of the lenses therein on the reflection-type liquid crystal panels 9R, 9G, and 9B sides form planes. Then, the cross dichroic prism 10 and the panel-side lens group 5P are glued to each other with a gelatinous transparent silicone (transparent adhesive) with a refractive index of 1.52 provided therebetween, and are fixed in this state by using an appropriate jig. Incidentally, the transparent silicone is characterized in those glued with the transparent silicone are easily separated when a force is applied thereto in a direction perpendicular to glued surfaces, while are not easily separated when a force is applied thereto in a direction parallel with the glued surfaces. In other words, since the transparent silicone is detachable with the force applied in the direction perpendicular to the glued surfaces, the gluing can be easily undone in the case where the cross dichroic prism 10 and the panel-side lens group 5P are erroneously glued to each other. Further, since the refractive index of the transparent silicone is substantially equal to that of glass forming the cross dichroic prism 10 and the panel-side lens group 5P, surface reflection by the cross dichroic prism 10 can be avoided.

FIG. 11 is an enlarged view illustrating the arrangement of the cross dichroic prism 10 and the polarizing plates 7R, 7G, and 7B, the λ/4 plates 8R, 8G, and 8B, and the reflection-type liquid crystal panels 9R, 9G, and 9B. The substantially parallel light L3 entering the cross dichroic prism 10 is decomposited into the red light LR, the blue light LB, and the green light LG. On surfaces of the cross dichroic prism 10 through which the lights LR, LB, and LG outgo, the polarizing plates 7R, 7G, and 7B and the λ/4 plates 8R, 8G, and 8B are applied, respectively.

The lights LR, LG, and LB transmitted through polarizing plates 7R, 7G, and 7B and the λ/4 plates 8R, 8G, and 8B are subjected to modulation of polarization directions thereof by the reflection-type liquid crystal panels 9R, 9G, and 9B, respectively, and are reflected by the same. Thereafter, the reflected lights LR, LG, and LB go through the λ/4 plates 8R, 8G, and 8B and the polarizing plates 7R, 7G, and 7B, respectively, and are composited by the cross dichroic prism 10, thereby becoming a projection light L4. The projection light L4 goes through the panel-side lens group 5P, and is once converged in one of division regions of a pupil region of the projection lens 5, in which the illuminating light incidence mirror 4 is not positioned. Thereafter, it goes through the screen-side lens group 5S, thereby becoming incident on the screen not shown.

A lens group which has an F number of 1.4 and includes a panel-side lens group with a diameter of 76mm is used as the projection lens 5, while a 50×50×57 mm cross dichroic prism is used as the cross dichroic prism 10. The projection lens 5 is relatively large in size, but since the cross dichroic prism 10 which is relatively small as means for decompositing/compositing colors is used, an optical system which is remarkably smaller as a whole than that in a conventional projection-type image display system can be realized.

Incidentally, even in the case where the surfaces of the lenses of the panel-side lens group 5P on the reflection-type liquid crystal panels 9R, 9G, and 9B side form a spherical surface like a usual lens, reflection by surfaces of the cross dichroic prism 10 can be avoided, by arranging optical coupling as described below. FIG. 12 is an enlarged view of the cross dichroic prism 10 and a part of the panel-side lens group 5P, illustrating how they are combined with each other in the case where the lens surfaces of the panel-side lens group 5P on the reflection-type liquid crystal panels 9R, 9G, and 9B side form a spherical surface like a usual lens. A coupler 11 made of a resin, a rubber, or the like is provided in a peripheral part of a surface of the cross dichroic prism 10 facing the panel-side lens group 5P. The cross dichroic prism 10 and the panel-side lens group 5P are glued to each other with the coupler 11 provided therebetween. Then, a gap enclosed by the cross dichroic prism 10, the panel-side lens group 5P, and the coupler 11 is filled with a coupling material 12, such as a gelatinous silicon transparent resin, or a transparent antifreeze solution. By setting a refractive index of the coupling material 12 substantially equal to the refractive index of glass, reflection by the surfaces of the cross dichroic prism 10 can be avoided.

Incidentally, the projection-type image display system in accordance with the present embodiment may be arranged so that the λ/4 plates 8R (8G, 8B) may be replaced with a pair of phase difference plates 81R (81G, 81B) and 82R (82G, 82B) as shown in FIG. 4 which are laminated on each other, like in the first embodiment. With such an arrangement, the contrast ratio can be further improved, as compared with the case where the λ/4 plates 8R, 8G, and 8B are provided.

As described above, the projection-type image display system in accordance with the present embodiment is capable of achieving the same effect as that of the first embodiment, and in addition, since the cross dichroic prism 10 is used as means for decompositing/compositing colors, the system can be made further less bulkier.

Furthermore, (i) the surface of the panel-side lens group 5P on the cross dichroic prism 10 side is made plane, (ii) the cross dichroic prism 10 and the panel-side lens group 5P are glued to each other with a gelatinous transparent silicone provided therebetween and are fixed in this state by using an appropriate jig. With this arrangement, the following effect can be achieved. Namely, reflection by the surfaces of the cross dichroic prism 10 can be avoided, while a coupling process can be simplified since the coupler 11 does not need to be provided. Further, in the manufacture process, the gluing can be easily undone in the case where the cross dichroic prism 10 and the panel-side lens group 5P are erroneously glued to each other. This ensures improvement of yield.

As described above, the projection-type image display system in accordance with the present embodiment may be provided so that (i) each of the reflection-type image display elements is a liquid crystal panel modulating a polarization direction of the incident light, which is equipped with a polarizing plate, and a phase difference plate provided between the polarizing plate and the liquid crystal panel, and (ii) optical coupling is arranged at least between the cross dichroic prism and the projection lens.

With the foregoing arrangement in which the λ/4 plate is used as the phase difference plate, a normally black display in which the reflected lights from the liquid crystal panels in dark display and the surface-reflected lights from the same are both blocked can be realized. Therefore, deterioration of the contrast ratios of projected images can be further prevented.

Furthermore, since the surface-reflected lights do not go through the polarizing plates in the case where the normally black display mode is selected as described above, optical coupling need not be arranged between the liquid crystal panels and the phase difference plates. Therefore, if optical coupling is arranged at least between the cross dichroic prism and the projection lens, it is possible to avoid the surface-reflected lights from the cross dichroic prism and the liquid crystal panels. This further ensures prevention of deterioration of the contrast ratios of projected images.

Furthermore, the foregoing projection-type image display system may be arranged so that one of the two lens groups constituting the projection lens, to which the reflected light from the reflection-type image display elements are incident, has a plane light-incident surface, and the cross dichroic prism is fixed to the light-incident surface so that the cross dichroic prism and the lens group are optically coupled.

In the case where, for example, one of the two lens groups constituting the projection lens, to which the reflected lights from the reflection-type image display elements are incident, has a spherical light-incident surface, complicated manufacturing processes are needed, such as a process of sealing a gap between the cross dichroic prism and the light-incident surface by applying a sealing material or the like along a periphery of the gap and a process of filling the gap with an optical coupling material. However, in the foregoing arrangement wherein the lens group on the reflected-light-incident side has a plane light-incident surface, optical coupling can be easily achieved by gluing the both with use of an optical adhesive.

Furthermore, the foregoing projection-type image display system may be arranged so that the cross dichroic prism is fixed to the light-incident surface so that the cross dichroic prism and the lens group are optically coupled, with use of a transparent adhesive which is detachable when a force is applied thereto in a specific direction.

If, for example, the cross dichroic prism is erroneously fixed to the light-incident surface with an adhesive which cannot be easily removed, undoing is impossible and there is no way other than disposing the both. Since lenses composing the projection lens and the cross dichroic prism are very expensive, such an error leads to a remarkable rise of manufacturing costs. With the foregoing arrangement, however, wherein the cross dichroic prism is fixed to the light-incident surface so that the cross dichroic prism and the lens group are optically coupled, even if the aforementioned error occurs in the manufacturing process, the fixing can be undone, whereby the rise of the manufacturing costs can be suppressed.

Furthermore, the foregoing projection-type image display system may be arranged so that (i) the polarizing plate and the phase difference plate are optically coupled with the cross dichroic prism, and (ii) a gap is provided between the reflection-type image display element and the polarizing plate.

With the foregoing arrangement wherein the polarizing plate and the phase difference plate are optically coupled with the cross dichroic prism, surface reflection by the polarizing plate and the phase difference plate can be prevented. Therefore, projected images with high contrast ratios can be provided.

In addition, since the reflection-type image display element is disposed with a gap between the same and the polarizing plate, relatively great freedom is allowed in positioning the reflection-type image display element. Therefore, fine adjustment of the position of the reflection-type image display element can be easily conducted.

Furthermore, the foregoing projection-type image display system may be arranged so that the phase difference plate is composed of a plurality of phase difference plate pieces laminated on one another.

In the foregoing arrangement, the configuration of the phase difference plate composed of a plurality of phase difference plate pieces laminated on one another and utilization of the phase difference caused by the liquid crystal panel makes it possible to cause even a light wave which has a wavelength more or less deviating from a desirable central wavelength of a transmissible light band to have a phase difference of approximately $\lambda/4$. Accordingly, even if light having more or less widely ranging wavelengths is incident, projected images with sufficiently high contrast ratios can be provided.

Furthermore, the foregoing projection-type image display system is arranged so that (i) each phase difference plate is composed of two phase difference plate pieces, (ii) a retardation amount of one of the phase difference plate pieces disposed on the polarizing plate side is set to about $\lambda/2$ (nm) and a retardation amount of the other phase difference plate piece disposed on the liquid crystal panel side is set to about $\lambda/4$ (nm) where $\lambda$ represents a central wavelength of the desired transmissible light band, and (iii) the phase difference plate pieces are disposed in a manner such that the fast or slow direction of the phase difference plate piece with the retardation amount of $\lambda/2$ (nm) is rotated through an angle of $\alpha(°)$ with respect to the transmission axis of the corresponding polarizing plate, while the fast or slow direction of the phase difference plate piece with the retardation amount of $\lambda/4$ (nm) is rotated through an angle of $2\times\alpha+45(°)$ with respect to the transmission axis of the corresponding polarizing plate.

With the foregoing arrangement, after a polarization state of light having been transmitted through the phase difference plate piece with the retardation amount of $\lambda/2$ (nm) becomes a state in which the polarization direction is rotated through an angle of $2\alpha(°)$ of longitude along the equator of the Poincaré sphere, the light becomes incident on the phase difference plate piece with the retardation amount of $\lambda/4$ (nm). Then, by further revolving the phase difference plate piece with the retardation of $\lambda/4$ (nm) through an angle of 45°, the polarization state of the outgoing light is shifted to a pole of the Poincaré sphere. Consequently, the phase difference plate pieces thus laminated on each other as a whole serve as the $\lambda/4$ plate.

Furthermore, the projection-type image display system may be arranged so that (i) each phase difference plate is composed of two phase difference plate pieces, and (ii) the following relationship is satisfied:

$$0.6 \times a - 5 - \lambda/20 < b < 0.6 \times a + 5 - \lambda/20$$

where $\lambda$ represents a central wavelength (nm) of a desired transmissible light band, a represents a retardation amount (nm) of the phase difference plate piece provided on the polarizing plate side, and b represents a retardation amount (nm) of the phase difference plate piece provided on the liquid crystal panel side.

With the foregoing arrangement, the function as the $\lambda/4$ plate is hardly degraded and deterioration of the contrast ratio of a projected image can be prevented, even if the retardation amounts of the phase difference plate pieces vary more or less. In other words, variation of the contrast ratio of the projected image which stems from variation of each retardation of the phase difference plate piece occurring in mass production of the same can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type image display system, comprising:
a light source emitting an illuminating light;
a reflection-type image display element for modulating an incident light in accordance with an image display state, and directly reflecting the incident light;
a projection lens composed of at least two lens groups, a pupil region of said projection lens being formed between said lens groups;
a polarizing plate between said projection lens and said reflection-type image display element;
said reflection-type image display element including a liquid crystal panel for modulating a polarization direction of the incident light and a reflector for reflecting incident light provided in said liquid crystal panel;
illuminating light introducing means for introducing the illuminating light to said reflection-type image display element, said illuminating light introducing means being provided in one of two pupil division regions which are formed by dividing the pupil region of said projection lens into two,
wherein after being directly reflected by said reflection-type image display element, the illuminating light goes through the other pupil division region of said projection lens and is projected, and
wherein said reflection-type image display element directly reflects incident light irrespective of a display state/non-display state of the projected image.

2. The projection-type image display system as set forth in claim 1, further comprising a dichroic mirror for decompositing the illuminating light, sending the decomposited lights to said reflection-type image display element, and compositing reflected lights from said reflection-type image display element.

3. The projection-type image display system as set forth in claim 2, wherein said dichroic mirror is composed of two dichroic mirror pieces, each dichroic mirror piece having a property of reflecting light of one of red, blue, and green color components and transmitting lights of the other color components.

4. The projection-type image display system as set forth in claim 3, wherein said dichroic mirror pieces are inclined with respect to an optical axis of said projection lens, in directions opposite to each other, respectively.

5. The projection-type image display system as set forth in claim 1, wherein a display mode of said liquid crystal panel is a birefringence mode in which an image is displayed by utilizing birefringence of liquid crystal and controlling the polarization direction of the incident light.

6. The projection-type image display system as set forth in claim 5, wherein the birefringence mode as the display mode of said liquid crystal panel is of a vertical alignment type in which liquid crystal molecules are aligned perpendicular to a panel surface.

7. The projection-type image display system as set forth in claim 1, wherein said polarizing plate is inclined with respect to said liquid crystal panel.

8. The projection-type image display system as set forth in claim 7, wherein the following relationship is satisfied:

$$\theta > (1/2) \cdot \tan^{-1}(1/2F)$$

where $\theta$ represents an angle at which said polarizing plate is inclined with respect to said liquid crystal panel, and F represents an F number of said projection lens.

9. The projection-type image display system as set forth in claim 1, further comprising a phase difference plate provided between said liquid crystal panel and said polarizing plate.

10. The projection-type image display system as set forth in claim 9, wherein said phase difference plate is inclined with respect to said liquid crystal panel.

11. The projection-type image display system as set forth in claim 10, wherein the following relationship is satisfied:

$$\theta > (1/2) \cdot \tan^{-1}(1/2F)$$

where $\theta$ represents an angle at which said polarizing plate is inclined with respect to said liquid crystal panel, and F represents an F number of said projection lens.

12. The projection-type image display system as set forth in claim 9, wherein said phase difference plate is composed of a plurality of phase difference plate pieces laminated on one another.

13. The projection-type image display system as set forth in claim 12, wherein said liquid crystal panel producing a phase difference and said phase difference plate provided on said liquid crystal panel function as a $\lambda/4$ plate.

14. The projection-type image display system as set forth in claim 12, wherein:
said phase difference plate is composed of two phase difference plate pieces;
a retardation amount of one of said phase difference plate pieces disposed on a polarizing plate side is set to about $\lambda/2$ (nm) and a retardation amount of the other phase difference plate piece provided on a liquid crystal panel side is set to about $\lambda/4$ (nm) where $\lambda$ represents a central wavelength (nm) of a desired transmissible light band; and
said phase difference plate pieces are disposed in a manner such that a fast or slow direction of said phase difference plate piece with the retardation amount of $\lambda/2$ (nm) is rotated through an angle of $\alpha(°)$ with respect to a transmission axis of said polarizing plate, while a fast or slow direction of said phase difference plate piece with the retardation amount of $\lambda/4$ (nm) is rotated through an angle of $2 \times \alpha + 45(°)$ with respect to the transmission axis of said polarizing plate.

15. The projection-type image display system as set forth in claim 12, wherein:
said phase difference plate is composed of two phase difference plate pieces; and
the following relation is satisfied:

$$0.6 \times a - 5 - \lambda/20 < b < 0.6 \times a + 5 - \lambda/20$$

where $\lambda$ represents a central wavelength (nm) of a desired transmissible light band, a represents a retardation amount (nm) of said phase difference plate provided on a polarizing plate side, and b represents a retardation amount (nm) of said phase difference plate provided on a liquid crystal panel side.

16. The projection-type image display system as set forth in claim 1, further comprising
a plurality of reflection-type image display elements, and
a cross dichroic prism for directing lights of color components resulting on decomposition of the illuminating light to said reflection-type image display elements, respectively, and compositing the lights of color components reflected from said reflection-type image display elements;
wherein a reflected light obtained by the composition of said cross dichroic prism goes through the second pupil division region of said projection lens.

17. The projection-type image display system as set forth in claim 16, wherein:

each of said reflection-type image display elements is a liquid crystal panel modulating a polarization direction of the incident light, each reflection-type image display element being equipped with a polarizing plate and a phase difference plate, said phase difference plate being provided between said polarizing plate and said liquid crystal panel; and optical coupling is arranged at least between said cross dichroic prism and said projection lens.

18. The projection-type image display system as set forth in claim 17, wherein a display mode of said liquid crystal panel is a birefringence mode in which an image is displayed by utilizing birefringence of liquid crystal and controlling the polarization direction of the incident light.

19. The projection-type image display system as set forth in claim 18, wherein the birefringence mode as the display mode of said liquid crystal panel is of a vertical alignment type in which liquid crystal molecules are aligned perpendicular to a panel surface.

20. The projection-type image display system as set forth in claim 17, wherein one of said two lens groups constituting said projection lens, to which the reflected lights from said reflection-type image display elements are incident, has a plane light-incident surface, and said cross dichroic prism is fixed to said light-incident surface so that said cross dichroic prism and said lens group are optically coupled.

21. The projection-type image display system as set forth in claim 20, wherein said cross dichroic prism is fixed to said light-incident surface so that said cross dichroic prism and said lens group are optically coupled, with use of a transparent adhesive which is detachable when a force is applied thereto in a specific direction.

22. The projection-type image display system as set forth in claim 21, wherein said transparent adhesive is made of a gelatinous transparent silicone having a refractive index substantially equal to a refractive index of glass.

23. The projection-type image display system as set forth in claim 17, wherein:

said polarizing plate and said phase difference plate are optically coupled with said cross dichroic prism; and a gap is provided between said reflection-type image display element and said polarizing plate.

24. The projection-type image display system as set forth in claim 17, wherein said phase difference plate is composed of a plurality of phase difference plate pieces laminated on one another.

25. The projection-type image display system as set forth in claim 24, wherein said liquid crystal panel producing a phase difference and said phase difference plate provided on said liquid crystal panel function as a $\lambda/4$ plate.

26. The projection-type image display system as set forth in claim 24, wherein:

said phase difference plate is composed of two phase difference plate pieces;

a retardation amount of one of said phase difference plate pieces disposed on a polarizing plate side is set to about $\lambda/2$ (nm) and a retardation amount of the other phase difference plate piece provided on a liquid crystal panel side is set to about $\lambda/4$ (nm) where $\lambda$ represents a central wavelength (nm) of a desired transmissible light band; and said phase difference plate pieces are disposed in a manner such that a fast or slow direction of said phase difference plate piece with the retardation amount of $\lambda/2$ (nm) is rotated through an angle of $\alpha(°)$ with respect to a transmission axis of said polarizing plate, while a fast or slow direction of said phase difference plate piece with the retardation amount of $\lambda/4$ (nm) is rotated through an angle of $2\times\alpha+45(°)$ with respect to the transmission axis of said polarizing plate.

27. The projection-type image display system as set forth in claim 24, wherein:

said phase difference plate is composed of two phase difference plate pieces; and the following relation is satisfied:

$$0.6 \times a - 5 - \lambda/20 < b < 0.6 \times a + 5 - \lambda/20$$

where $\lambda$ represents a central wavelength (nm) of a desired transmissible light band, a represents a retardation amount (nm) of said phase difference plate provided on a polarizing plate side, and b represents a retardation amount (nm) of said phase difference plate provided on a liquid crystal panel side.

28. The projection-type image display system as set forth in claim 8 wherein said liquid crystal panel has a surface which is parallel with a plane perpendicular to the optical axis of said projection lens.

29. The projection-type image display system as set forth in claim 11 wherein said liquid crystal panel has a surface which is parallel with a plane perpendicular to the optical axis of said projection lens.

\* \* \* \* \*